(12) United States Patent
Morita et al.

(10) Patent No.: US 10,775,998 B2
(45) Date of Patent: Sep. 15, 2020

(54) ELECTRONIC DEVICE AND CONTROL METHOD

(71) Applicant: KYOCERA Corporation, Kyoto (JP)

(72) Inventors: Hisae Morita, Yokohama (JP); Masaki Matsuo, Yokohama (JP); Kana Masaki, Kawasaki (JP); Kyouhei Suzuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 77 days.

(21) Appl. No.: 15/855,425

(22) Filed: Dec. 27, 2017

(65) Prior Publication Data

US 2018/0188943 A1   Jul. 5, 2018

(30) Foreign Application Priority Data

Jan. 4, 2017   (JP) ................... 2017-000232
Jan. 4, 2017   (JP) ................... 2017-000233
Jan. 4, 2017   (JP) ................... 2017-000234

(51) Int. Cl.
*G06F 3/0488*   (2013.01)
*G06F 3/042*   (2006.01)
(Continued)

(52) U.S. Cl.
CPC .......... *G06F 3/04883* (2013.01); *G06F 3/017* (2013.01); *G06F 3/0304* (2013.01);
(Continued)

(58) Field of Classification Search
CPC .......... G06F 2203/04101; G06F 3/017; G06F 3/0304; G06F 3/0416; G06F 3/042; G06F 3/04817; G06F 3/04845; G06F 3/0487; G06F 3/04883; G06F 3/013; G06F 3/0483; G06F 3/04812; G06F 1/1632;
(Continued)

(56) References Cited

U.S. PATENT DOCUMENTS 7,469,381 B2   12/2008   Ording
8,209,606 B2   6/2012   Ording
(Continued)

FOREIGN PATENT DOCUMENTS

JP   2012-049952 A   3/2012
JP   2013-077925 A   4/2013
(Continued)

OTHER PUBLICATIONS

An Office Action; "Notice of Reasons for Rejection," issued by the Japanese Patent Office dated Oct. 10, 2017, which corresponds to Japanese Patent Application No. 2017-153681.
(Continued)

*Primary Examiner* — Richard J Hong
(74) *Attorney, Agent, or Firm* — Studebaker & Brackett PC

(57) ABSTRACT

The electronic device (1) includes a proximity sensor (18), a touch panel display (display 14) configured to display an icon that serves to enable a predetermined mode and gesture detection via the proximity sensor (18) and a controller (11) configured to, when a touch on the icon is detected, start the predetermined mode, start gesture detection via the proximity sensor (18) and change a characteristic of the icon. The controller (11) may change the color or the shape of the icon.

5 Claims, 14 Drawing Sheets

(51) Int. Cl.
*G06F 3/0481* (2013.01)
*G06F 3/041* (2006.01)
*H04M 1/725* (2006.01)
*G06F 3/0484* (2013.01)
*G06F 3/03* (2006.01)
*G06F 3/01* (2006.01)
*G06F 3/0487* (2013.01)

(52) U.S. Cl.
CPC ............ *G06F 3/042* (2013.01); *G06F 3/0416* (2013.01); *G06F 3/0487* (2013.01); *G06F 3/04817* (2013.01); *G06F 3/04845* (2013.01); *H04M 1/72583* (2013.01); *G06F 2203/04101* (2013.01); *H04M 1/72569* (2013.01); *H04M 2250/12* (2013.01); *H04M 2250/22* (2013.01)

(58) Field of Classification Search
CPC ......... H04M 1/72569; H04M 1/72583; H04M 2250/12; H04M 2250/22; G06Q 10/06; H04W 4/12; F24C 7/083; G01S 7/415
See application file for complete search history.

(56) References Cited

U.S. PATENT DOCUMENTS

| | | | |
|---|---|---|---|
| 8,255,798 B2 | 8/2012 | Ording | |
| 8,312,371 B2 | 11/2012 | Ording | |
| 8,365,090 B2 | 1/2013 | Ording | |
| 8,990,274 B1* | 3/2015 | Hwang | G06Q 10/06 708/133 |
| 9,052,814 B2 | 6/2015 | Ording | |
| 9,485,351 B2 | 11/2016 | Kobayashi et al. | |
| 9,619,132 B2 | 4/2017 | Ording | |
| 2008/0055247 A1* | 3/2008 | Boillot | G06F 3/017 345/158 |
| 2008/0134102 A1* | 6/2008 | Movold | G06F 3/017 715/863 |
| 2008/0168404 A1 | 7/2008 | Ording | |
| 2009/0066728 A1 | 3/2009 | Ording | |
| 2009/0070704 A1 | 3/2009 | Ording | |
| 2009/0070705 A1 | 3/2009 | Ording | |
| 2009/0073194 A1 | 3/2009 | Ording | |
| 2009/0077488 A1 | 3/2009 | Ording | |
| 2011/0018795 A1* | 1/2011 | Jang | G06F 3/0304 345/156 |
| 2012/0293404 A1* | 11/2012 | Federico | G06F 3/017 345/156 |
| 2012/0299862 A1* | 11/2012 | Matsumoto | G06F 1/1632 345/173 |
| 2013/0293454 A1* | 11/2013 | Jeon | G06F 3/017 345/156 |
| 2013/0328761 A1* | 12/2013 | Boulanger | G06F 3/017 345/156 |
| 2014/0282272 A1* | 9/2014 | Kies | G06F 3/013 715/863 |
| 2015/0172452 A1 | 6/2015 | Kobayashi et al. | |
| 2015/0234562 A1 | 8/2015 | Ording | |
| 2015/0346831 A1 | 12/2015 | Nii | |
| 2016/0124594 A1* | 5/2016 | Phelan-Tran | G06F 3/0483 345/173 |
| 2017/0068416 A1* | 3/2017 | Li | G06F 3/04812 |
| 2017/0131395 A1* | 5/2017 | Reynolds | G01S 7/415 |
| 2017/0212674 A1 | 7/2017 | Ording | |
| 2017/0223168 A1* | 8/2017 | Singh | H04W 4/12 |
| 2018/0107282 A1 | 4/2018 | Jeon et al. | |
| 2018/0180293 A1* | 6/2018 | Holzinger | F24C 7/083 |

FOREIGN PATENT DOCUMENTS

| | | |
|---|---|---|
| JP | 2013-211031 A | 10/2013 |
| JP | 2013-235588 A | 11/2013 |
| JP | 2014-045231 A | 3/2014 |
| JP | 2015-043802 A | 3/2015 |
| JP | 2015-225493 A | 12/2015 |

OTHER PUBLICATIONS

Gijyutsu Hyoron Co., Ltd., Starting from zero docomo, 2016-00482-001 (Galaxy S6 SC-05G), Smart guide, The easiest to follow docomo SC-05G guidebook, Best-selling smartphone series, pp. 42-44, ISBN978-4-7741-7470-9 C3055.

Gijyutsu Hyoron Co., Ltd., Starting from zero docomo, 2016-01385-001 (Galaxy Note Edge SC-01G), Smart guide, The easiest to follow docomo SC-01G guidebook, Best-selling smartphone series, pp. 50-52, ISBN978-4-7741-7019-0 C3055.

An Office Action issued by the Japanese Patent Office dated Jan. 9, 2018, which corresponds to Japanese Patent Application No. 2017-153681 and is related to U.S. Appl. No. 15/855,425; with English language concise explanation.

* cited by examiner (Normal mode)

(Kitchen mode)

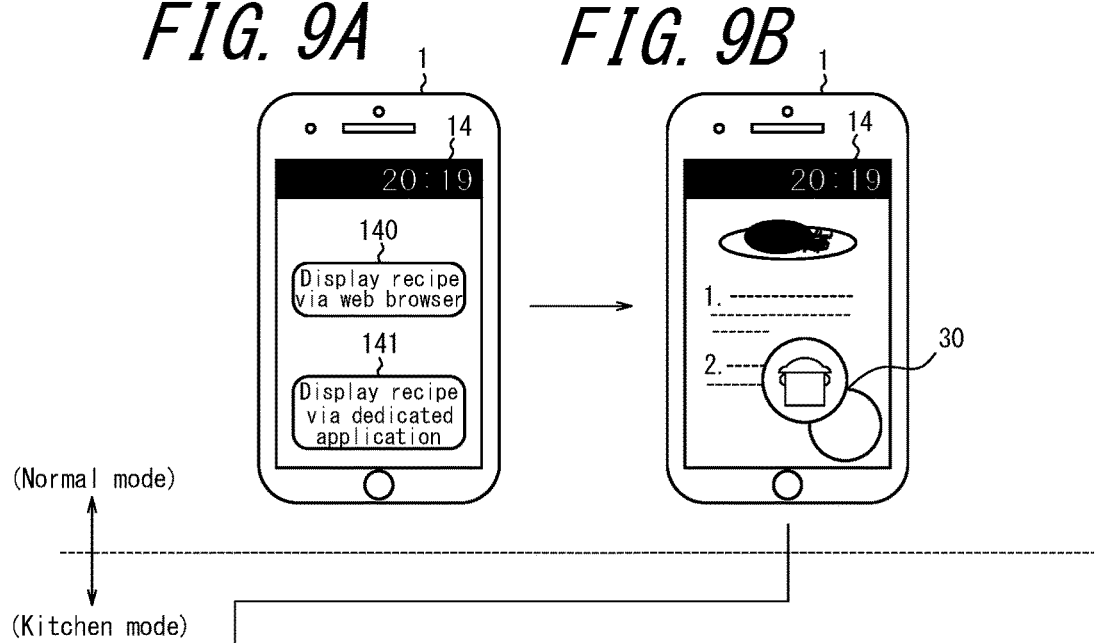

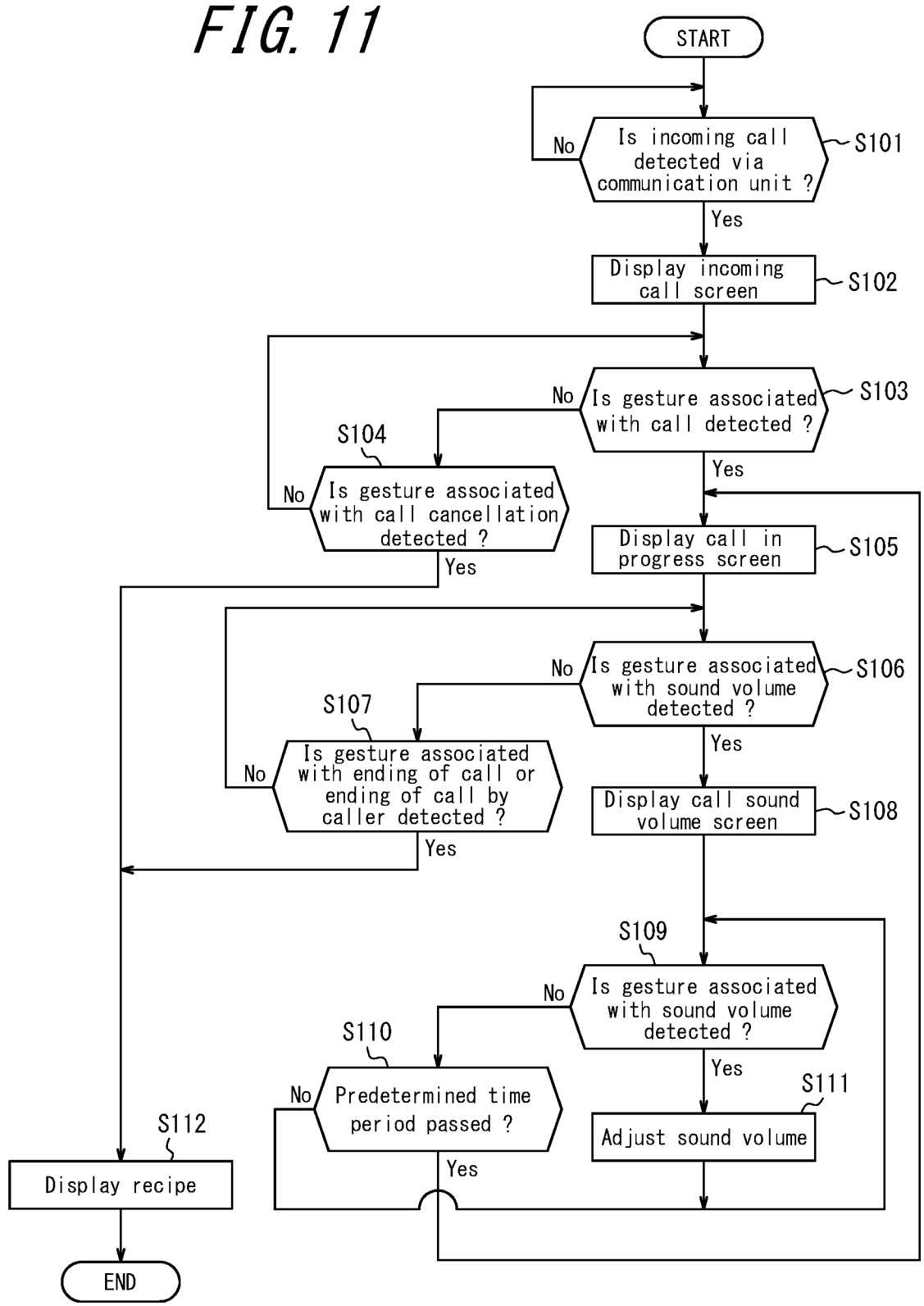

(Normal mode)

(Kitchen mode)

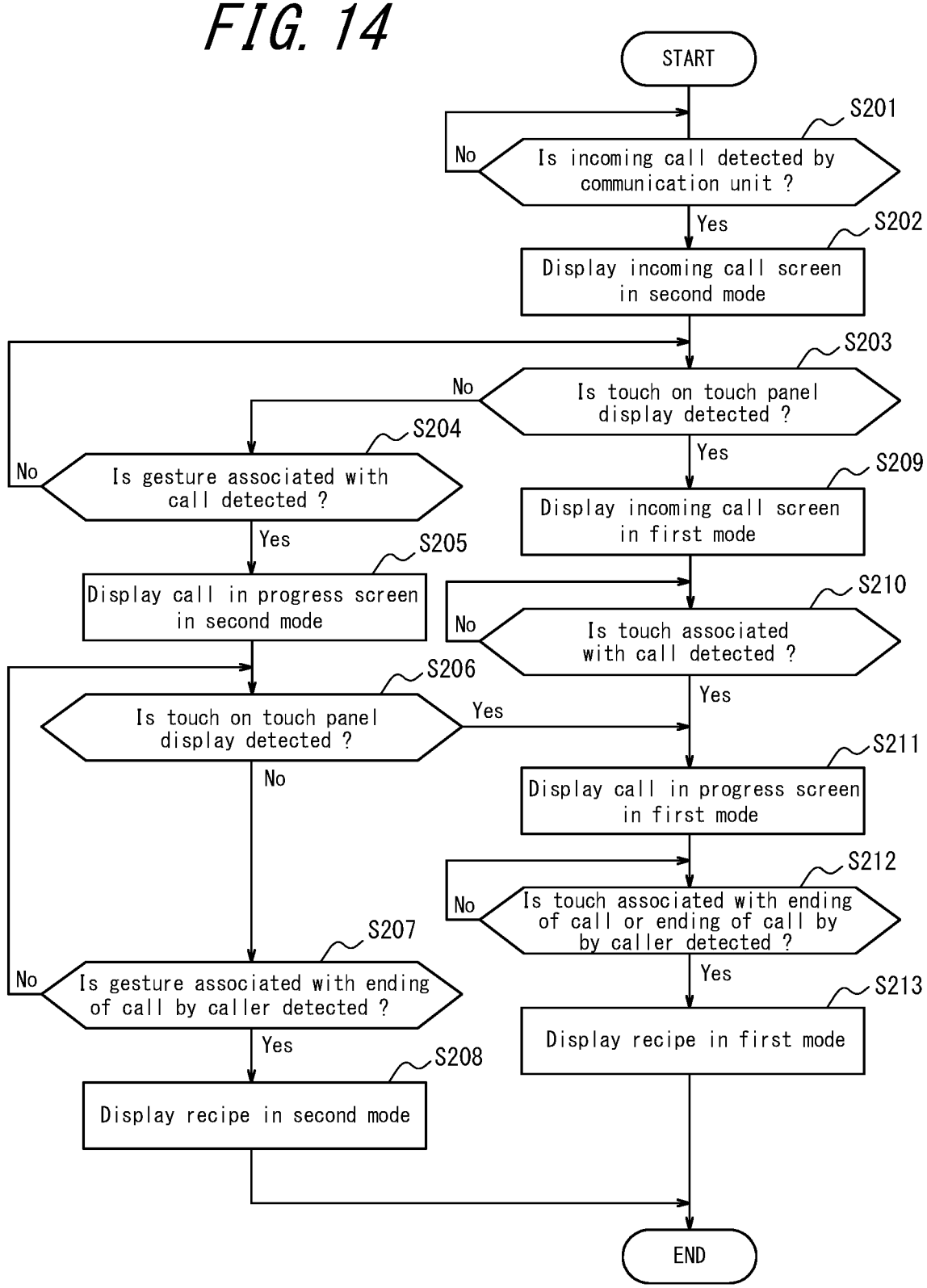

ELECTRONIC DEVICE AND CONTROL METHOD

CROSS-REFERENCE TO RELATED APPLICATIONS

The present disclosure claims priority from and the benefit of Japanese Patent Application Nos. 2017-000232 (filed on Jan. 4, 2017), 2017-000233 (filed on Jan. 4, 2017) and 2017-000234 (filed on Jan. 4, 2017), the entire contents of which are incorporated herein by reference.

TECHNICAL FIELD

This disclosure relates to an electronic device and a control method.

BACKGROUND

In recent years, electronic devices that detect gestures via a proximity sensor such as an infrared sensor and perform input operations corresponding to the gestures are known.

SUMMARY

An electronic device according to one embodiment of the present disclosure includes a proximity sensor and a touch panel display configured to display an icon that serves to enable a predetermined mode and gesture detection via the proximity sensor. The electronic device further includes a controller configured, when a touch on the icon is detected, to start a predetermined mode and gesture detection via the proximity sensor, and to change characteristics of the icon.

A control method according to one embodiment of the present disclosure is a control method of an electronic device, in which, when a touch on the icon is detected, a specific mode and gesture detection by a proximity sensor are started and characteristics of the icon are changed. The electronic device includes a proximity sensor and a touch panel display configured to display an icon that serves to enable a predetermined mode and gesture detection via the proximity sensor.

An electronic device according to one embodiment of the present disclosure includes a proximity sensor, a communication unit, and a controller configured to respond based on a gesture detected via the proximity sensor when a telephone call is detected by the communication unit while a cooking recipe is displayed.

A control method according to one embodiment of the present disclosure is a control method of an electronic device, in which, when a telephone call is detected by a communication unit while a cooking recipe is displayed, the electronic device responds based on a gesture detected by a proximity sensor. The electronic device includes a proximity sensor and a communication unit.

An electronic device according to one embodiment of the present disclosure includes a proximity sensor, a touch panel display and a communication unit. Further, the electronic device is used based on a gesture detected via the proximity sensor. The electronic device includes a controller configured to turn off gesture detection via the proximity sensor when the communication unit detects an incoming call and the user touches the touch panel display to answer the call.

A control method according to one embodiment of the present disclosure is a control method of an electronic device including a proximity sensor, a touch panel display and a communication unit, in which the electronic device is used based on a gesture detected via the proximity sensor. The control method includes, when the communication unit detects an incoming call and the user touches the touch panel display to answer the call, turning off gesture detection via the proximity sensor.

According to the present disclosure, an electronic device with improved operability and a control method thereof can be provided.

BRIEF DESCRIPTION OF THE DRAWINGS

In the accompanying drawings:

FIGS. 9A through 9F are diagrams each illustrating a screen display of the electronic device;

FIG. 11 is a flowchart illustrating an example of a process performed by an electronic device according to an embodiment;

FIG. 14 is a flowchart illustrating an example of a process executed by an electronic device according to an embodiment.

DETAILED DESCRIPTION

One Embodiment (Configuration of Electronic Device)

Figure 1:
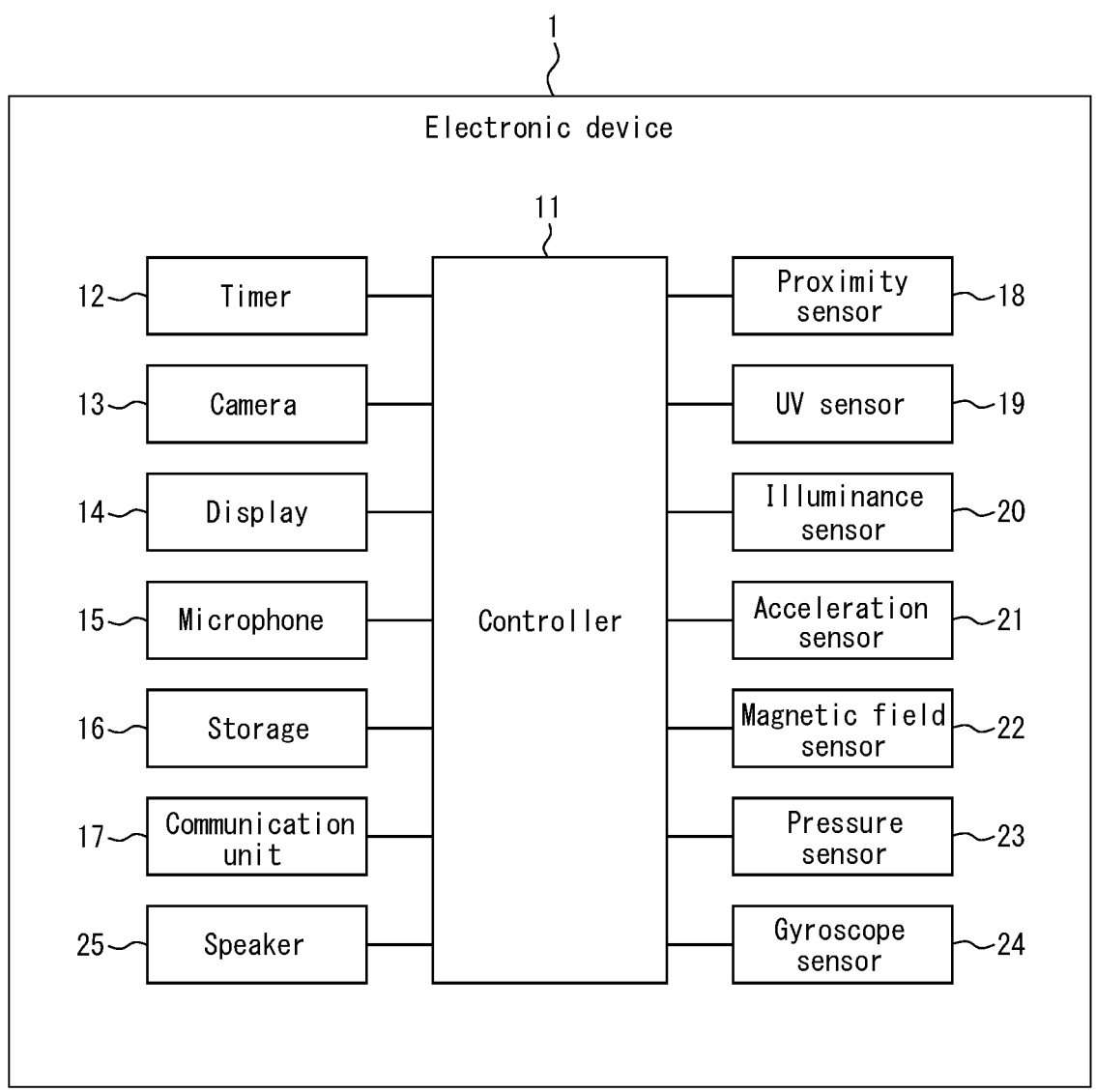
FIG. 1 is a schematic block diagram of an electronic device according to an embodiment.

As illustrated in FIG. 1, an electronic device 1 according to an embodiment includes a timer 12, a camera 13, a display 14, a microphone 15, a storage 16, a communication unit 17, a speaker 25, a proximity sensor 18 (gesture sensor) and a controller 11. The electronic device 1 further includes a UV sensor 19, an illuminance sensor 20, an acceleration sensor 21, a magnetic field sensor 22, a pressure sensor 23 and a gyroscope sensor 24. FIG. 1 is provided as an example. The electronic device 1 may not include all of the components illustrated in FIG. 1. The electronic device 1 may include components other than those illustrated in FIG. 1.

The timer 12 receives an instruction for timer operation from the controller 11, and, after lapse of a predetermined time period, outputs a signal to that effect to the controller 11. As illustrated in FIG. 1, the timer 12 may be provided independently from the controller 11 or internal to the controller 11.

The camera 13 captures an object in the vicinity of the electronic device 1. As an example, the camera 13 is a front facing camera mounted on a surface on which the display 14 of the electronic device 1 is provided.

The display 14 displays a screen. The screen includes at least one of a character, an image, a symbol, a figure and the like. The display 14 may be a liquid crystal display, an organic electro-luminescence (EL) panel or an inorganic electro-luminescence (EL) panel, and the like. In the present embodiment, the display 14 is a touch panel display (touch screen display). The touch panel display detects a touch by a finger, a stylus pen, and the like, and identifies a position on the screen touched thereby. The display 14 can simultaneously detect a plurality of positions touched by the finger or the stylus pen.

The microphone 15 detects sound, including human voice, in the vicinity of the electronic device 1.

The storage 16 serves as a memory for storage of programs and data. The storage 16 temporarily stores the processing results of the controller 11. The storage 16 may include an optional storage device such as a semiconductor storage device or a magnetic storage device. The storage 16 may include different kinds of storage devices. The storage 16 may include a combination of a portable storage medium such as a memory card and a reader of the storage medium.

Programs stored in the storage 16 include applications executed in foreground or background and control programs for supporting operation of applications. An application allows the controller 11 to execute a process in response to a gesture, for example. The control programs include an operating system (OS), for example. Applications and control programs may be installed in the storage 16 via communication by the communication unit 17 or via a storage medium.

The communication unit 17 is an interface for wired or wireless communications. The communication method performed by the communication unit 17 according to an embodiment is a wireless communication standard. For example, the wireless communication standard may include one or more of the 2G, 3G and 4G cellular phone communication standards. Cellular phone communication standards include, for example, Long Term Evolution (LTE), Wideband Code Division Multiple Access (W-CDMA), CDMA2000, Personal Digital Cellular (PDC), Global System for Mobile communications (GSM®) (GSM is a registered trademark in other countries), Personal Handy-phone System (PHS) and the like. Wireless communication standards include, for example, Worldwide Interoperability for Microwave Access (WiMAX), IEEE802.11, Bluetooth® (Bluetooth is a registered trademark in Japan, other countries, or both), Infrared Data Association (IrDA), Near Field Communication (NFC), and the like. The communication unit 17 can support one or more of the above described communication standards.

The speaker 25 outputs sound. For example, the voice of another party is output from the speaker 25 during a call. Further, when news or weather forecast is read out, the content thereof is output from the speaker 25 via sound.

The proximity sensor 18 contactlessly detects a relative distance and direction of movement between the electronic device 1 and an object in the vicinity thereof. In the present embodiment, the proximity sensor 18 has one infrared light emitting diode (LED) as a light source and four infrared photodiodes. The proximity sensor 18 emits infrared light from the infrared LED to the object and receives the light reflected from the object as incident light at the infrared photodiodes. The proximity sensor 18 can measure the relative distance to the object based on the output current from the infrared photodiodes. Further, the proximity sensor 18 detects the direction of movement of the object based on the difference between the times at which light reflected from the object enters each of the infrared photodiodes. Therefore, the proximity sensor 18 can detect an operation with air gestures (hereinafter referred merely as "gestures") by the user of the electronic device 1 performed without touching the electronic device 1. The proximity sensor 18 may include visible light photodiodes.

The controller 11 is a processor such as a Central Processing Unit (CPU), for example. The controller 11 may also be an integrated circuit such as a System-on-a-Chip (SoC) in which other components are integrated. The controller 11 may be configured by combining a plurality of integrated circuits. The controller 11 controls overall operation of the electronic device 1 to realize a variety of functions.

Specifically, the controller 11 refers to data stored in the storage 16 as needed. The controller 11 realizes a variety of functions by executing instructions included in a program stored in the storage 16 to control the other functional units such as the display 14. For example, the controller 11 obtains data relating to a touch made by the user and detected via the touch panel. For example, the controller 11 obtains information relating to a gesture made by the user and detected via the proximity sensor 18. For example, the controller 11 obtains information relating to the remaining countdown time (i.e. timer time) from the timer 12. Further, the controller 11 recognizes the starting state of an application, for example.

The UV sensor 19 can measure the amount of ultraviolet light contained in sunlight.

The illuminance sensor 20 detects the illuminance of ambient light incident thereon.

The acceleration sensor 21 detects the direction and the size of an acceleration acting on the electronic device 1. The acceleration sensor 21 is a triaxial (i.e. 3D) type acceleration sensor that detects acceleration in x-axial, y-axial and z-axial directions. The acceleration sensor 21 may be a piezoresistive type or a capacitance type acceleration sensor, for example.

The magnetic field sensor 22 detects the direction of geomagnetism to allow for measurement of the orientation of the electronic device 1.

The pressure sensor 23 detects the pressure (i.e. atmospheric pressure) outside of the electronic device 1.

The gyroscope sensor 24 detects the angular velocity of the electronic device 1. The controller 11 can measure the change in the orientation of the electronic device 1 through time integration of the angular velocity obtained by the gyroscope sensor 24.

(Operation of Electronic Device Using Gestures)

Figure 2:
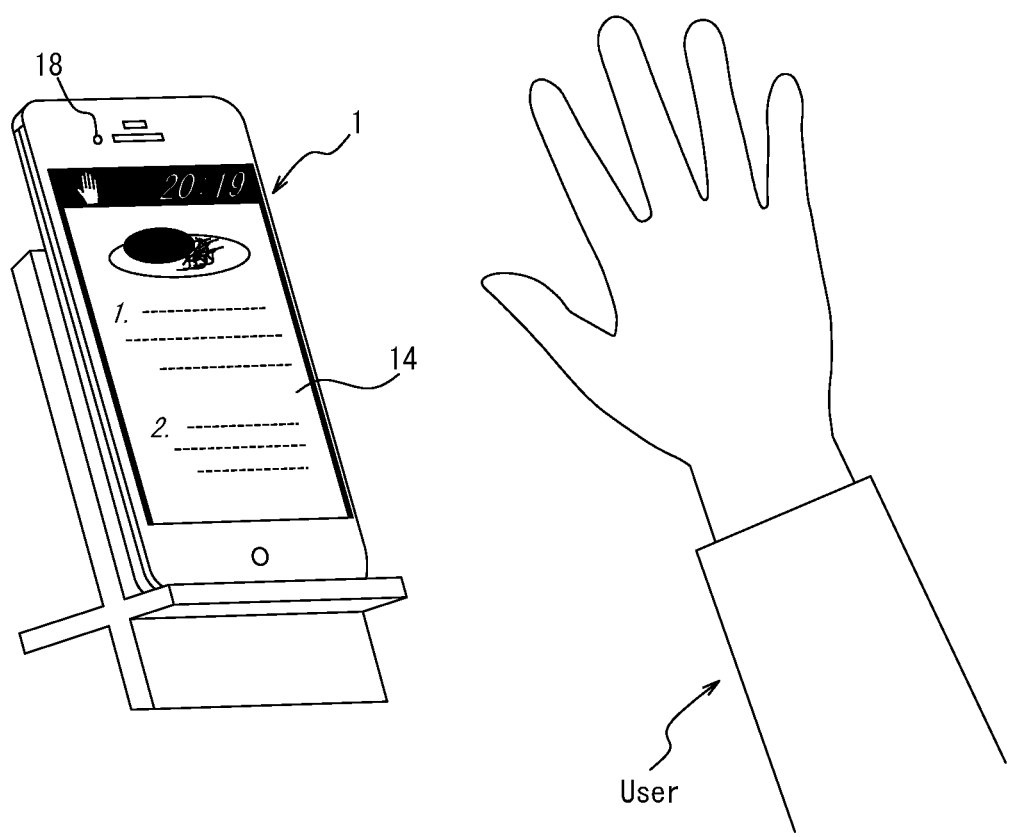
FIG. 2 is a diagram illustrating a user operating the electronic device using gestures.

FIG. 2 illustrates a state in which the user operates the electronic device 1 using gestures. In FIG. 2, as an example, the electronic device 1 is supported by a stand. Alternatively, the electronic device 1 may be positioned to lean against a wall or placed on a table. When the proximity sensor 18 detects a user's gesture, the controller 11 executes a process based on the gesture detected. In the example illustrated in FIG. 2, the process based on the gesture is scrolling of a screen on which a recipe is displayed. For example, when the user performs a gesture of moving a hand upward in the longitudinal direction of the electronic device 1, the screen scrolls up in response to the movement of the hand. Further, when the user performs a gesture of moving a hand downward in the longitudinal direction of the electronic device 1, the screen scrolls down in response to the movement of the hand.

The electronic device 1 illustrated in FIG. 2 is a smartphone. Alternatively, the electronic device 1 may be a mobile phone terminal, a phablet, a tablet PC, a feature phone, and the like. The electronic device 1 is not limited to the above described devices, and may include, for example, a PDA, a remote control terminal, a portable music player, a game machine, an electronic book reader, a car navigation system, household appliances or industrial devices (e.g. factory automation equipment) and the like.

(Method of Detecting Gestures)

Figure 3:
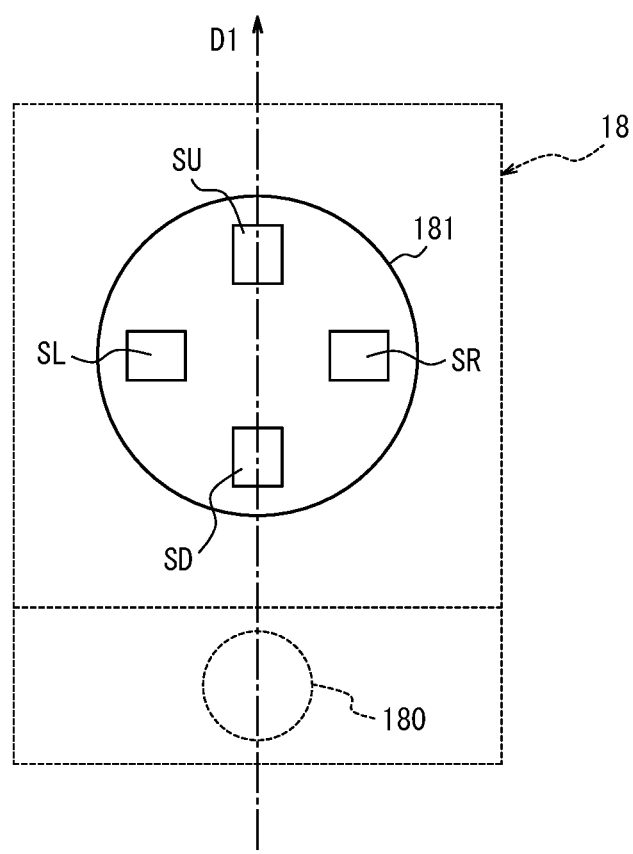
FIG. 3 is a schematic diagram of a proximity sensor.

A method of detecting a gesture made by a user performed by the controller 11 based on an output from the proximity sensor 18 is described below with reference to FIGS. 3 and 4. FIG. 3 is a diagram illustrating an example configuration of the proximity sensor 18 when the electronic device 1 is viewed from the front. The proximity sensor 18 has an infrared LED as a light source 180 and four infrared photodiodes, SU, SR, SD and SL. The four infrared photodiodes, SU, SR, SD and SL detect the light reflected from an object to be detected through a lens 181. The four infrared photodiodes, SU, SR, SD and SL are symmetrically disposed about the center of the lens 181. The virtual line D1 indicated in FIG. 3 is approximately parallel to the longitudinal direction of the electronic device 1. The infrared photodiodes SU and SD are disposed separately on the virtual line D1 in FIG. 3. Further, the infrared photodiodes SR and SL are disposed between the infrared photodiodes SU and SD in the direction of the virtual line D1 in FIG. 3.

Figure 4:
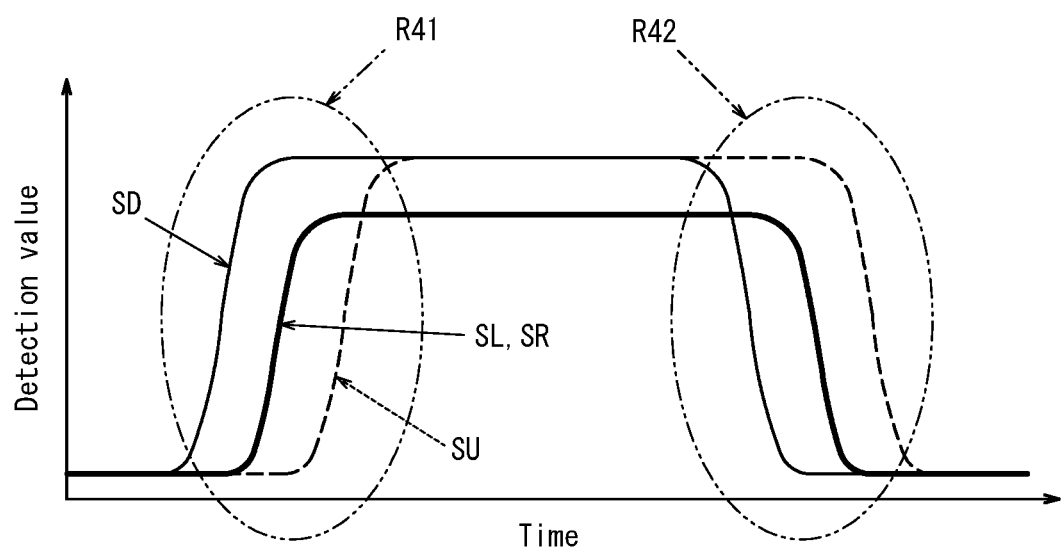
FIG. 4 is a diagram illustrating changes in a detection value detected by each of a plurality of infrared photodiodes.

FIG. 4 illustrates changes in detection values when the object (e.g. a user's hand and the like) to be detected by the four infrared photodiodes, SU, SR, SD and SL, moves along the direction of the virtual line D1 in FIG. 3. In FIG. 4, the distance between the infrared photodiodes SU and SD is the largest in the direction of the virtual line D1. Thus, as illustrated in FIG. 4, the time difference between the change (e.g. an increase) of the detection value (dashed line) of the infrared photodiode SU and the change (e.g. an increase) of the detection value (thin solid line) of the infrared photodiode SD is the largest. The controller 11 can determine the moving direction of the object to be detected by recognizing the time difference of a predetermined change in the detection values of the photodiodes SU, SR, SD and SL.

The controller 11 obtains detection values of the photodiodes SU, SR, SD and SL from the proximity sensor 18. The controller 11 may integrate a value obtained by subtracting a detection value of the photodiode SU from a detection value of the photodiode SD in a predetermined time period to recognize the movement of the object to be detected in the direction of the virtual line D1. In the example illustrated in FIG. 4, the integral value is nonzero in areas R41 and R42. The controller 11 can recognize the movement of the object to be detected in the direction of the virtual line D1 based on the change in this integration value (e.g. change from positive value to negative value via zero).

Further, the controller 11 may integrate a value obtained by subtracting the detection value of the photodiode SR from the detection value of the photodiode SL in a predetermined time period. The controller 11 can recognize the movement of the object to be detected in the direction orthogonal to the virtual line D1 (i.e. the direction approximately parallel to the transverse direction of the electronic device 1) based on the change in the integrated value (e.g. a change from positive value to a negative value via zero).

Alternatively, the controller 11 may calculate by using all detection values of the photodiodes SU, SR, SD and SL. Specifically, the controller 11 may recognize the moving direction of the object to be detected without separating the movement into longitudinal and transverse components for calculation.

Gestures to be detected include, for example, a side-to-side gesture, an up-and-down gesture, a diagonal gesture, a gesture forming a circle in a clockwise manner and a gesture forming a circle in a counterclockwise manner. For, example, a side-to-side gesture is a gesture performed in the direction approximately parallel to the transverse direction of the electronic device 1. The up-and-down gesture is a gesture performed in the direction approximately parallel to the longitudinal direction of the electronic device 1. The diagonal gesture is a gesture performed in a direction which is not approximately parallel to either the longitudinal direction or the transverse direction of the electronic device 1 on the flat surface approximately parallel to the electronic device 1.

(Kitchen Mode)

Figure 5:
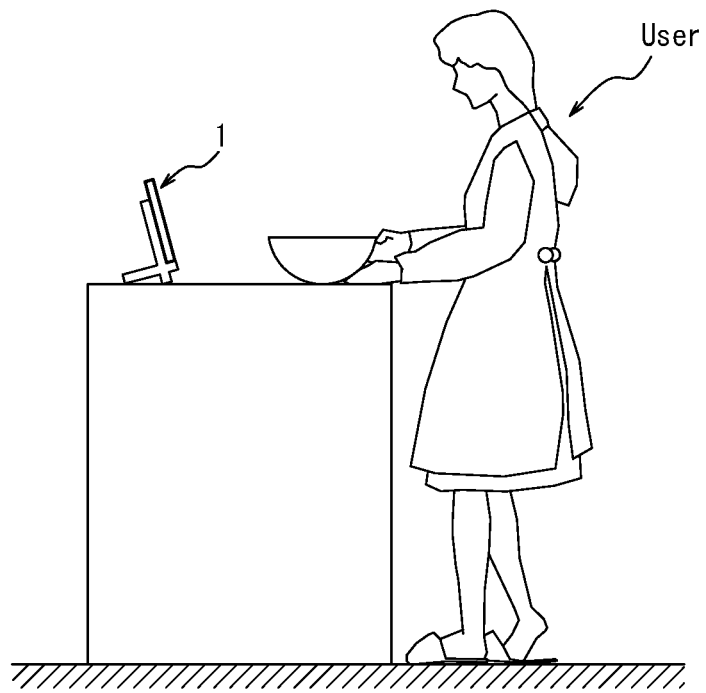
FIG. 5 is a diagram illustrating a user operating the electronic device using gestures.

FIG. 5 illustrates an example of a situation in which the user operates the electronic device 1 using gestures. In the examples illustrated in FIG. 5, the user cooks in the kitchen following a recipe while displaying the recipe on the display 14 of the electronic device 1. At this time, the proximity sensor 18 detects a user's gesture. The controller 11 then performs a process based on the gesture detected via the proximity sensor 18. For example, the controller 11 can perform a process of scrolling a recipe in response to a specific gesture (e.g. a gesture of moving a hand up or down). The user's hand may get dirty or wet during cooking. However, the user can scroll the recipe without touching the electronic device 1, which may prevent the display 14 from getting dirty and prevent the user's hand from being stained by dirt on the display 14 during cooking.

The electronic device 1 has a plurality of modes. A mode refers to an operation mode (i.e. operating condition or state) that limits the overall operation of the electronic device 1. Only one mode can be selected simultaneously. In the present embodiment, the modes of the electronic device 1 include a first mode and a second mode. The first mode is a normal operation mode (i.e. normal mode) suitable for use in a room other than a kitchen and outdoors, for example. The second mode is an operation mode (i.e. kitchen mode) suitable for cooking while displaying a recipe in the kitchen. As described above, in the case of the second mode, it is preferable that input operations can be performed using gestures. More specifically, when the electronic device 1 is switched to the second mode, preferably, the proximity sensor 18 may be operated in response to the switching to enable gesture detection. As described below, the electronic device 1 according to the present embodiment allows the proximity sensor 18 to be operated in response to switching to the second mode (i.e. kitchen mode).

(Screen Display Example)

Figure 6A:
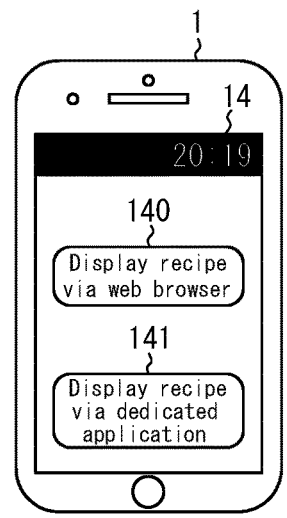
FIGS. 6A through 6E are diagrams each illustrating a screen display of the electronic device.
Figure 6B:
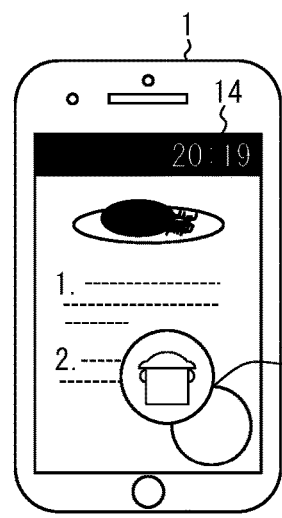
Figure 6C:
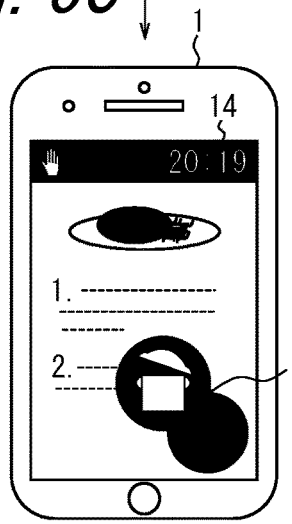
Figure 6D:
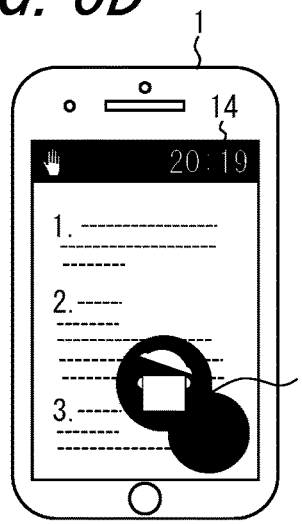
Figure 6E:
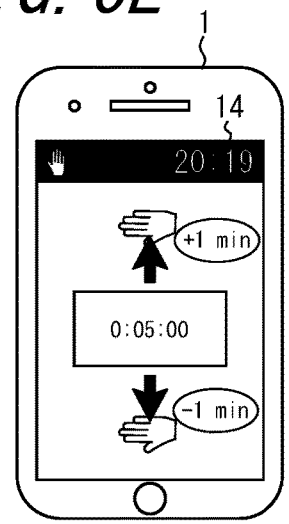

FIGS. 6A through 6E illustrate examples of screens displayed on the display 14 of the electronic device 1 according to the present embodiment. As described above, the electronic device 1 has, in addition to the first mode (i.e. normal mode), the second mode (i.e. kitchen mode) suitable for cooking in a kitchen while displaying a recipe. When the screens as illustrated in FIGS. 6A and 6B are displayed, the electronic device 1 operates in the first mode (i.e. normal mode). When the screens as illustrated in FIGS. 6C, 6D and 6E are displayed, the electronic device 1 operates in the second mode (i.e. kitchen mode).

FIG. 6A is an example of a screen that includes selection buttons 140 and 141. The user taps the selection button 140 or the selection button 141 to display a recipe search screen. Thus, the user can display a recipe which results from the search.

The selection button 140 is selected when the user wishes to search for a recipe via a web browser, and display the recipe which results from the search. The selection button 141 is selected when the user wishes to search for a recipe via a dedicated application, and display the recipe which results from the search. Note that, although the dedicated application can access a server over the Internet to obtain recipe data, some recipe data may be stored in the storage 16 of the electronic device 1 in advance. Even if the user is in an environment where a transmission speed is low, for example, he/she can quickly search for and display a recipe stored in the storage 16 via the dedicated application through selection of the selection button 141.

FIG. 6B is an example of a screen displayed when the user taps the selection button 140 or 141 to search for a recipe via the web browser or the dedicated application, and display the recipe which results from the search on the screen. An icon 30 is displayed over the recipe on the screen illustrated in FIG. 6B. The icon 30 has a shape of two circles connected such that they partially overlap with each other. Either one of the circles of the icon 30 may be slightly larger than the other one. A picture of a pot is indicated on the larger circle of the icon 30. Upon detecting that the icon 30 has been tapped by the user, the controller 11 switches between the first mode and the second mode. When the screen illustrated in FIG. 6B is displayed, the electronic device 1 operates in the first mode (i.e. normal mode). When the user taps the icon 30, the mode of the electronic device 1 is switched to the second mode (i.e. kitchen mode). Further, the mode of the electronic device 1 is switched to the first mode when the user taps the icon 30 while the electronic device 1 is operating in the second mode.

FIG. 6C is an example of the screen after the user has tapped the icon 30 and the mode of the electronic device 1 is switched to the second mode (i.e. kitchen mode). At this time, the electronic device 1 operates the proximity sensor 18 to enable detection of gestures by the user. The icon 30 displayed on the display 14 serves to enable the kitchen mode and gesture detection via the proximity sensor 18. Upon detecting a touch on the icon 30, the controller 11 starts the kitchen mode and starts gesture detection via the proximity sensor 18, and changes a characteristic of the icon 30A. In the example illustrated in FIG. 6C, the controller 11 changes the color of the icon 30. The color inside the two circles of the icon 30 changes from white to black. The controller 11 also changes the shape of the icon 30. The picture of the pot in the icon 30 changes from showing the lid of the pot in a closed state to showing the lid of the pot in an open state. In other examples, upon detecting a touch on the icon 30, the controller 11 may change the contour shape of the icon 30; the controller 11 may change only the color of the icon 30; and the controller 11 may change only the shape of the icon 30. The user can easily recognize that the electronic device 1 is in the second mode and a gesture is detected via the proximity sensor 18 based on the change in the characteristic of the icon 30 displayed on the display 14.

FIG. 6D illustrates a state in which the screen on which a recipe is displayed is scrolled in response to the user's gesture. The controller 11 scrolls the screen based on a first gesture (e.g. a gesture of moving a hand in the vertical direction) made by the user detected via the proximity sensor 18. In FIG. 6D, the whole screen moves upward based on the gesture where the user moves his/her hand upward.

FIG. 6E illustrates a state in which a timer screen is displayed in response to a user gesture. The controller 11 switches from display of the recipe to display of a timer screen based on a second gesture (e.g. a gesture of holding a hand over the screen for a predetermined time period such as one second) made by the user detected via the proximity sensor 18. In the example illustrated in FIG. 6E, although the screen is switched from that illustrated in FIG. 6C, it is also possible to switch from the screen illustrated in FIG. 6D to the timer screen.

(Icon Scaling)

Figure 7A:
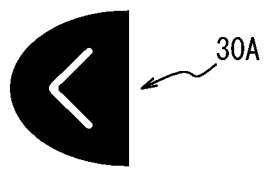
FIGS. 7A through 7E are diagrams each illustrating a characteristic of an icon.

In the second mode (i.e. kitchen mode), the icon 30 may hide a part of the recipe being displayed (see FIG. 6D, for example). When a gesture different from the detected one is detected during an operation performed based on a gesture detected via the proximity sensor 18, the controller 11 may scale up or scale down the icon 30. In this case, the gesture detected via the proximity sensor 18 is, for example, the above described first gesture and the second gesture. Further, the operations based on a gesture include, for example, screen scrolling and display of a timer screen. Furthermore, the different gesture is, for example, a gesture of moving a hand in the horizontal direction. For example, when the proximity sensor 18 detects a gesture of moving a hand from left to right, the controller 11 changes the icon 30 to the characteristic of the icon 30A illustrated in FIG. 7A. Further, when the proximity sensor 18 detects a gesture of moving a hand from right to left, for example, the controller 11 switches the characteristic of the icon 30A illustrated in FIG. 7A back to the icon 30. The icon 30A illustrated in FIG. 7A has a shape different from that of the icon 30, and is smaller than the icon 30. That is, changing the icon 30 to the characteristic of the icon 30A illustrated in FIG. 7A is a scale down display. Further, switching the characteristic of the icon 30A illustrated in FIG. 7A back to the icon 30 is a scale up display. The user scales down the display of the icon 30 with a gesture to allow for easy reading of a recipe. As another example, the icon 30 may be scaled up or down while its shape (two circles which are connected such that they are partially overlapped) remains the same.

(Icon Linked with Timer Operation)

When the timer screen (see FIG. 6E) is displayed on the display 14, the controller 11 executes timer operation based on gestures detected via the proximity sensor 18. The controller 11 adjusts the timer time based on a first gesture (e.g. a gesture of moving a hand in the vertical direction) by the user detected via the proximity sensor 18. For example, when the proximity sensor 18 detects a gesture of moving a hand from down to up once, the controller 11 adds one minute to the timer time. Further, when the proximity sensor 18 detects a gesture of moving a hand from up to down once, the controller 11 subtracts one minute from the timer time. The controller 11 hides (i.e. does not display) the timer screen and displays a recipe again based on the second gesture (e.g. a gesture of holding a hand over the screen for a predetermined time period such as one second) detected via the proximity sensor 18. Moreover, the controller 11 executes the timer (i.e. to start countdown) based on another gesture (e.g. a gesture of moving a hand from left to right) detected via the proximity sensor 18.

Figure 7B:
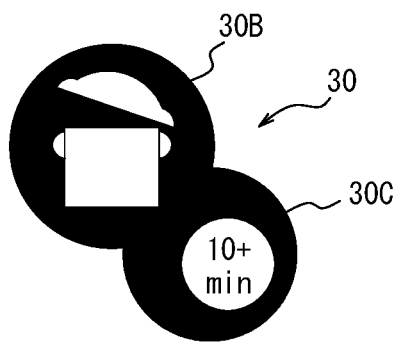
Figure 7C:
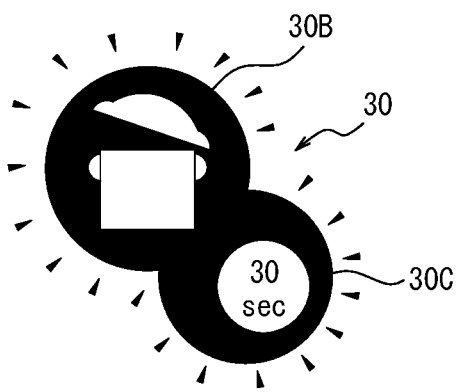

In the present embodiment, when the timer is executed, the controller 11 changes a characteristic of the icon 30 in response to the timer state. As illustrated in FIG. 7B, the icon 30 is composed of a circular area 30B on which a picture of a pot is illustrated and a circular area 30C connected thereto. Upon execution of the timer, the controller 11 displays timer time in the area 30C of the icon 30. The area 30C may be not large enough to completely display the timer time. In the present embodiment, when the timer time is over 10 minutes, the controller 11 displays "10+min" as illustrated in FIG. 7B. When the timer time is 10 minutes or less and more than 5 minutes, the controller 11 displays "10 min." When the timer time is 5 minutes or less and more than 3 minutes, the controller 11 displays "5 min." In the same manner, the controller 11 displays "3 min.," "1 min." and "30 sec." Such display of the icon 30 displayed with a recipe allows the user to know the approximate remaining time of the timer even if the timer screen is hidden. In this case, the controller 11 may flash the icon 30 in response to the timer state. For example, as illustrated in FIG. 7C, the icon 30 may be flashed when the timer time is 30 sec. or less to indicate only a little time left.

Figure 7D:
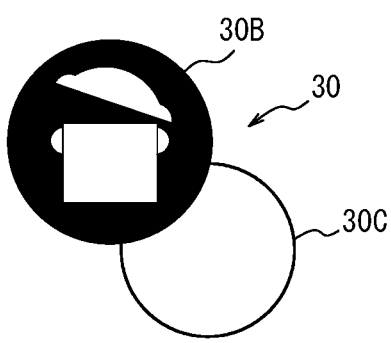

In the present embodiment, a change in the color of the area 30B of the icon 30 is linked with a change in the color of the area 30C. For example, when the user taps the icon 30 to switch the mode of the electronic device 1 to the second mode (i.e. kitchen mode), the colors of the area 30B and the area 30C are changed to black regardless of whether the timer is being executed or not. However, in another embodiment, the area 30C may remain white if the timer is not executed when the electronic device 1 is switched to the second mode, as illustrated in FIG. 7D.

Figure 7E:
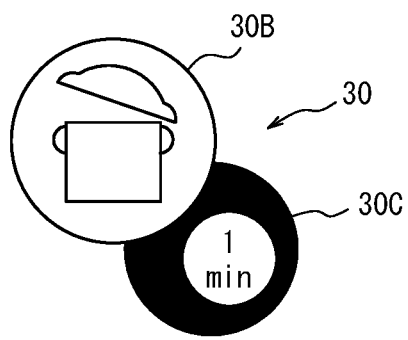

Further, in another embodiment, when the timer is being executed, the area 30C may be changed to black to indicate the timer time regardless of the mode of the electronic device 1. For example, as illustrated in FIG. 7E, upon detecting that the area 30C of the icon 30 is tapped by the user, the controller 11 may execute the timer without changing the mode of the electronic device 1 from the first mode (i.e. normal mode). At this time, in the icon 30, the color and the shape of the area 30B do not change, and only the color of the area 30C changes. The timer time is then displayed on the area 30C.

(Flowchart)

Figure 8:
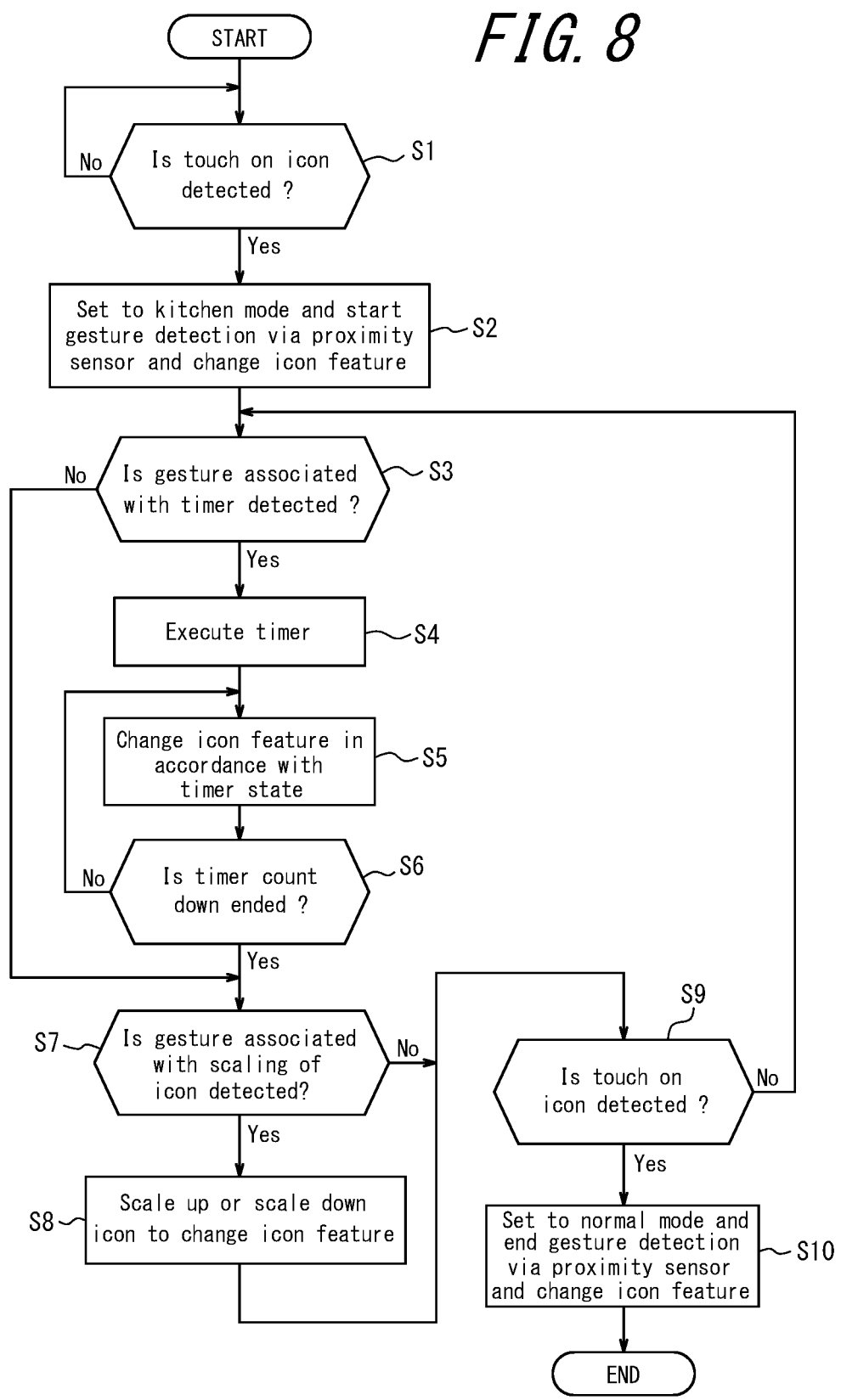
FIG. 8 is a flowchart illustrating an example of a process executed by an electronic device according to an embodiment.

FIG. 8 is a flowchart illustrating an example of process steps (i.e. control method) executed by the controller 11 of the electronic device 1 according to the present embodiment. Initially, the electronic device 1 operates in the first mode (i.e. normal mode).

The controller 11 waits until the display 14 detects a touch on the icon 30 by the user (No at step S1). When the display 14 detects a touch on the icon 30 by the user (Yes at step S1), the controller 11 is set into a predetermined mode (i.e. a second mode, that is, a kitchen mode) and starts gesture detection via the proximity sensor 18. The controller 11 starts gesture detection and also changes the characteristic of the icon 30 (step S2). In the present embodiment, a change of characteristic of the icon 30 refers to a change of color and shape as illustrated in FIGS. 6B and 6C, for example.

When the proximity sensor 18 does not detect a gesture associated with the timer, the controller 11 causes the process to proceed to step S7 (No at step S3). When the proximity sensor 18 detects a gesture associated with the timer (Yes at step S3), the controller 11 executes the timer (step S4). Note that the gesture associated with the timer encompasses a gesture performed by the user to instruct the timer to execute and a gesture to adjust the timer time when the timer screen is displayed on the display 14.

The controller 11 changes the characteristic of the icon 30 in response to the state of the timer (step S5). That is, the controller 11 displays the timer time on the area 30C of the icon 30 in response to the state of the timer. The controller 11 continues the process step S5 until the timer countdown ends (No at step S6). The controller 11 causes the process to proceed to step S7 when the timer countdown ends (Yes at step S6).

When the proximity sensor 18 detects a gesture associated with scaling of the icon 30 (Yes at step S7), the controller 11 scales up or scales down the icon 30 such that the characteristics thereof differ from the current characteristics (step S8). Note that the gesture associated with scaling is, for example, a gesture of moving a hand in the horizontal direction. After step S8, and when the proximity sensor 18 does not detect a gesture associated with the scaling of the icon 30 (No at step S7), the controller 11 causes the process to proceed to step S9.

When the display 14 detects a touch on the icon 30 made by the user (Yes at step S9), the controller 11 is set to the normal mode to end gesture detection via the proximity sensor 18 and also to change the characteristic of the icon 30 (step S10). At this time, the characteristic of the icon 30 is returned to the characteristic as illustrated in FIG. 6B, for example. The controller 11 then ends the series of process steps. The controller 11 causes the process to return to step S3 when a touch on the icon 30 made by the user is not detected (No at step S9).

As described above, the electronic device 1 according to the present embodiment includes the proximity sensor 18 and the display 14 configured to display the icon 30 that serves to enable the kitchen mode and gesture detection via the proximity sensor 18. The electronic device 1 also includes the controller 11 configured, upon detecting a touch on the icon 30, to start the kitchen mode and start gesture detection via the proximity sensor 18, and to change the characteristic of the icon 30. As described above, the icon 30 associates the kitchen mode with the gesture detection via the proximity sensor 18. Specifically, the electronic device 1 is switched to the kitchen mode via operation (i.e. tapping) of the icon 30 by the user, and enables detection of an air gesture. Accordingly, the operability of the electronic device 1 can be improved.

One Embodiment

An electronic device 1 according to one embodiment will be described with reference to FIGS. 9A through 11. The configuration of the electronic device 1 according to the present embodiment is the same as that according to the above described embodiment. The electronic device 1 according to the present embodiment enables a variety of processes in response to various situations to be consistently performed by an input operation using gestures, as described below.

(Screen Display Examples)

FIGS. 9A through 9F illustrate examples of screens displayed on the display 14 of the electronic device 1 according to the present embodiment. As described above, in addition to the first mode (i.e. normal mode), the electronic device 1 has a second mode (i.e. kitchen mode) suitable for cooking in a kitchen while displaying a recipe. When the screens illustrated in FIGS. 9A and 9B are displayed, the electronic device 1 operates in the first mode (i.e. normal mode). When the screens illustrated in FIGS. 9C, 9D, 9E and 9F are displayed, the electronic device 1 operates in the second mode (i.e. kitchen mode).

FIG. 9A is an example of a screen that includes selection buttons 140 and 141. The user taps the selection button 140 or the selection button 141 to display a recipe search screen. Thus, the user can then display a recipe which results from a search.

The selection button 140 is selected when the user wishes to search for a recipe via the web browser, and display the recipe which results from the search. Specifically, when the user selects the selection button 140, a recipe is displayed on the web browser. The selection button 141 is selected when the user wishes to search for a recipe via a dedicated application, and display the recipe which results from the search. Specifically, when the user selects the selection button 140, a recipe is displayed via a dedicated application related to the recipe. Note that, although the dedicated application can access a server over the Internet to obtain recipe data, some recipe data may already be stored in the storage 16 of the electronic device 1. Even if the user is in the environment in which the transmission speed is low, for example, he/she can quickly search for and display a recipe stored in the storage 16 via the dedicated application through selection of the selection button 141.

FIG. 9B is an example of a screen displayed when the user taps the selection button 140 or the selection button 141 to search for a recipe via the web browser or the dedicated application, and display the recipe which results from the search on the screen. An icon 30 is displayed over the recipe on the screen illustrated in FIG. 9B. The icon 30 has a shape of two circles connected such that they partially overlap with each other. Either one of the circles of the icon 30 may be slightly larger than the other one. A picture of a pot is indicated on the larger circle of the icon 30. Upon detecting that the icon 30 has been tapped by the user, the controller 11 switches between the first mode and the second mode. When the screen illustrated in FIG. 9B is displayed, the electronic device 1 operates in the first mode (i.e. normal mode). When the user taps the icon 30, the mode of the electronic device 1 is switched to the second mode (i.e. kitchen mode). Further, the mode of the electronic device 1 is switched to the first mode when the user taps the icon 30 while the electronic device 1 is operating in the second mode.

FIG. 9C is an example of the screen after the user has tapped the icon 30 and the mode of the electronic device 1 is switched to the second mode (i.e. kitchen mode). At this time, the electronic device 1 operates the proximity sensor 18 to enable detection of gestures by the user. The icon 30 displayed on the display 14 serves to enable the kitchen mode and gesture detection via the proximity sensor 18. Upon detecting a touch on the icon 30, the controller 11 starts the kitchen mode and starts gesture detection via the proximity sensor 18, and changes a feature of the icon 30A. In the example illustrated in FIG. 9C, the controller 11 changes the color of the icon 30. The color inside the two circles of the icon 30 changes from white to black. The controller 11 also changes the shape of the icon 30. The picture of the pot in the icon 30 changes from showing the lid of the pot in a closed state to showing the lid of the pot in an open state. The user can easily recognize that the electronic device 1 is in the second mode and a gesture is detected via the proximity sensor 18 based on the change in the characteristic of the icon 30 displayed on the display 14.

When the screen illustrated in FIG. 9C is displayed, the controller 11 controls the screen display based on user gestures detected via the proximity sensor 18. When a gesture made by moving a hand in the vertical direction is detected via the proximity sensor 18, for example, the controller 11 scrolls the screen on which the recipe is displayed. Further, when a gesture made by holding a hand over the screen for a predetermined time period, such as one second, is detected via the proximity sensor 18, the controller 11 switches the recipe display to the timer screen display. Further, when the communication unit 17 detects an incoming call while a recipe is displayed in the second mode (kitchen mode), the controller 11 responds to the call based on the gesture detected via the proximity sensor 18 as described below.

(Incoming Call in Second Mode and Call)

FIG. 9D is an example of a screen which is displayed upon arrival of an incoming call. When the incoming call arrives, the controller 11 switches the recipe display screen illustrated in FIG. 9C to the incoming call screen illustrated in FIG. 9D. In the screen example illustrated in FIG. 9D, an image, a name and a phone number of a caller are displayed on the display 14. Further, a guide indicating that the call can be answered by a gesture made by moving a hand from left to right is displayed on the display 14. The user can answer the call by making a gesture by moving his/her hand from left to right. At this time, the controller 11 operates the microphone 15 and the speaker 25 to enable hands-free communication. At this time, when determining that a predetermined time period has passed (e.g. 15 sec.) without the user answering the call, the controller 11 returns the screen to the recipe display screen illustrated in FIG. 9. Further, the controller 11 may cancel the call based on a gesture detected via the proximity sensor 18. For example, when the proximity sensor 18 detects a gesture of holding a hand over the screen for a predetermined period of time period (e.g. 3 sec.), the controller 11 cancels the call and returns the screen to the recipe display screen illustrated in FIG. 9C. At this time, the controller 11 may activate a message memo to record a message from a caller.

FIG. 9E is an example of a screen which is displayed when the user answers an incoming call. When the proximity sensor 18 detects a gesture made by moving a hand from left to right, the controller 11 switches the incoming call screen illustrated in FIG. 9D to a call in progress screen illustrated in FIG. 9E. In the screen example illustrated in FIG. 9E, an image, a name and a phone number of the caller and a call duration time are displayed in a small region of the display 14. Further, a guide indicating that the user can end the call via a gesture made by holding a hand over the screen is displayed on the display 14. When the proximity sensor 18 detects a gesture of holding a hand over for a predetermined time period (e.g. 3 sec.), the controller 11 returns the screen to the recipe display screen illustrated in FIG. 9C.

FIG. 9F is an example of a screen which is displayed when the user adjusts the sound volume during a call. The controller 11 changes the call sound volume based on gestures detected via the proximity sensor 18. For example, when the proximity sensor 18 detects a gesture made moving a hand in the vertical direction, the controller 11 switches the call in progress screen illustrated in FIG. 9E to the call sound volume screen illustrated in FIG. 9F. In the screen example illustrated in FIG. 9F, a slide bar indicating the call sound volume is displayed on the display 14. Further, a guide indicating that the sound volume can be increased by a gesture made by moving a hand from down to up and that the sound volume can be decreased by making a gesture of moving a hand from up to down is displayed on the display 14. When determining that a predetermined time period (e.g. 3 sec.) has passed without the user performing a gesture for adjusting the sound volume, the controller 11 returns the screen to the call in progress screen illustrated in FIG. 9E.

In the present embodiment, the incoming call screen, the call in progress screen and the call sound volume screen are automatically displayed full-screen. Note that the full-screen refers to the entire area of the display 14 excluding a notification bar. At this time, the recipe and the icon 30 are not displayed. Further, when the incoming call screen is automatically displayed on the full area of the screen, for example, the controller 11 may limit operations preformed based on gestures detected via the proximity sensor 18 to operations for answering an incoming call (e.g. gestures for answering and cancelling a call). The notification bar is a belt-like black area located on the upper part of the display 14. In the examples illustrated in FIGS. 9D, 9E and 9F, a pictogram (pictorial symbol) indicating that the proximity sensor 18 is operating and the current time are displayed on the notification bar. Pictograms indicating, for example, a radio wave state, a manner mode, a battery charge state, and the like may further be displayed on the notification bar.

(Similarity Between Gesture and Touch Operation)

Figure 10A:
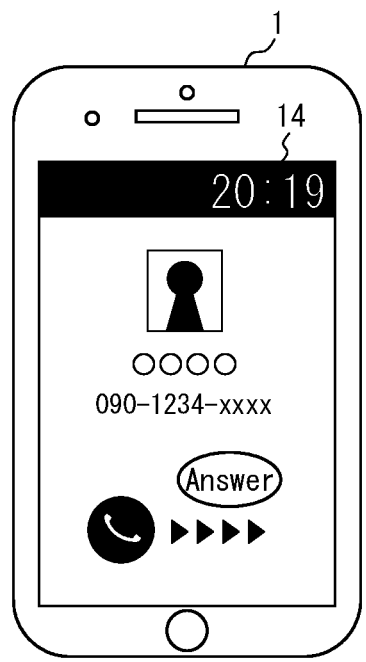
FIGS. 10A and 10B are diagrams each illustrating a screen display in a first mode.
Figure 10B:
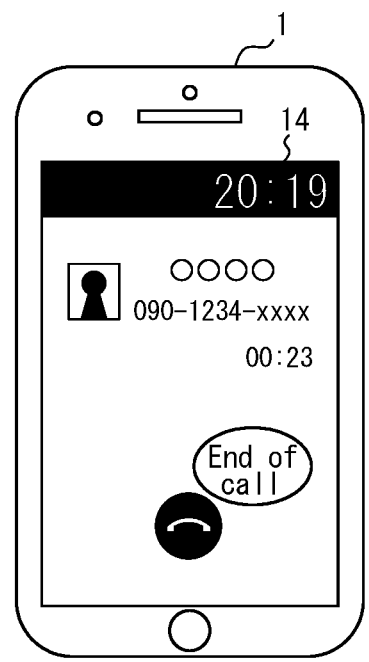

FIG. 10A illustrates an incoming call screen when the electronic device 1 operates in the first mode (normal mode). The incoming call screen illustrated in FIG. 10A displays a guide indicating that the user can answer the call through a touch operation (slide operation) of moving his/her hand from left to right. FIG. 10B displays a call in progress screen when the electronic device 1 operates in the first mode (normal mode). The call in progress screen illustrated in FIG. 10B displays a guide indicating that a call can be ended through an operation (tap operation) in which the user touches the icon.

When the electronic device 1 operates in the second mode (kitchen mode), the user can answer a call by a gesture of moving his/her hand from left to right (see FIG. 9D). In the present embodiment, the direction of the gesture of answering the call detected via the proximity sensor 18 is the same as the direction of touch when the user answers a call via the touch panel (display 14). Further, when the electronic device 1 operates in the second mode (kitchen mode), the user can end a call by a gesture of holding a hand over the screen (see FIG. 9E). In the present embodiment, the end of call is conveyed by a gesture of holding a hand over the screen, which corresponds to a tap operation of the touch panel (display 14). In this manner, in terms of the electronic device 1, there is a commonality or a similarity between a gesture of answering a call and ending a call in the second mode and the touch operation in the first mode. In the electronic device 1 according to the present embodiment, the touch operation in the first mode is consistent with the gesture operation in the second mode corresponding thereto, and thus the user can operate by intuition.

(Flowchart)

FIG. 11 is a flowchart illustrating an example of process steps (e.g. control method) performed by the controller 11 of the electronic device 1 according to the present embodiment. The flowchart in FIG. 11 illustrates process steps which are performed upon arrival of an incoming call while the electronic device 1 displays a recipe in the second mode (i.e. kitchen mode).

The controller 11 waits for an incoming call while a recipe is displayed on the display 14 unless a call is detected via the communication unit (No at step S101). When an incoming call is detected via the communication unit (Yes at step S101), the controller 11 displays an incoming call screen (step S102). The incoming call screen is as illustrated in FIG. 9D, for example.

When the proximity sensor 18 detects a gesture associated with answering the call (Yes at step S103), the controller 11 displays a call in progress screen (step S105). The call in progress screen is, for example, a screen as illustrated in FIG. 9E. Further, in the present embodiment, the gesture associated with answering the call is a gesture where the user moves his/her hand from left to right.

When the proximity sensor 18 does not detect a gesture associated with answering the call (No at step S103), the controller 11 determines whether a gesture associated with cancellation of the call is detected (step S104). In the present embodiment, the gesture associated with cancellation of the call is a gesture where a user holds his/her hand over the screen for a predetermined time period (e.g. 3 sec.).

When the proximity sensor 18 detects the gesture associated with cancellation of the call (Yes at step S104), the controller 11 returns to the screen indicating a recipe (step S112) and ends the series of process steps. The screen indicating a recipe is a screen as illustrated in FIG. 9C, for example.

When the proximity sensor 18 does not detect a gesture associated with cancellation of call (No at step S104), the controller 11 causes the process to return to step S103. At step S104, the controller 11 may further determine whether a predetermined time period (e.g. 15 sec.) has passed without the proximity sensor 18 detecting the gesture associated with answering the call. The controller 11 also causes the process to return to step S103 when a predetermined time period has passed without the proximity sensor 18 detecting a gesture associated with answering the call.

After the call in progress screen has been displayed (step S105), the controller 11 displays a call sound volume screen (step S108) when the proximity sensor 18 detects a gesture associated with sound volume (Yes at step S106). The call sound volume screen is a screen as illustrated in FIG. 9F, for example. Further, in the present embodiment, the gesture associated with answering the call is a gesture where a user moves his/her hand in the vertical direction.

When the proximity sensor 18 does not detect a gesture associated with the sound volume (No at step S106), the controller 11 determines whether or not the gesture associated with ending of the call is detected, or ending of the call by the caller is detected (step S107). In the present embodiment, the gesture associated with ending of the call is a gesture where a user holds his/her hand over the screen for a predetermined time period (e.g. 3 sec.). Further, the controller 11 detects ending of the call by the caller via the communication unit 17.

When the proximity sensor 18 detects a gesture associated with ending of the call or detects ending of the call by a caller (Yes at step S107), the controller 11 returns the screen to the recipe display screen (step S112) and ends the series of process steps.

When the proximity sensor 18 does not detect a gesture associated with ending of the call and further does not detect ending of the call by the caller (No at step S107), the controller 11 causes the process to return to step S106.

After the call sound volume screen has been displayed (step S108), when the proximity sensor 18 detects a gesture associated with sound volume (Yes at step S109), the controller 11 adjusts the sound volume (step S111). In the present embodiment, when the proximity sensor 18 detects a gesture where the user moves his/her hand from down to up, the controller 11 increases the volume. Further, when the proximity sensor 18 detects a gesture where the user moves his/her hand from up to down, the controller 11 decreases the sound volume. The controller 11 then causes the process to return to step S109.

When the proximity sensor 18 does not detect a gesture associated with the sound volume (No at step S109), the controller 11 determines whether a predetermined time period has passed (step S110). In the present embodiment, a predetermined time period is 3 sec., for example. When a predetermined time period has passed without the proximity sensor 18 detecting the gesture associated with the sound volume (Yes at step S110), the controller 11 causes the process to return to step S105. When the predetermined time period has not passed (No at step S110), the controller 11 causes the process to return to step S109.

In the process at step S108, the controller 11 may not only display a call volume screen but also adjust the volume. In this case, the controller 11 increases the volume when the proximity sensor 18 detects a gesture where a user moves his/her hand from down to up at step S106. Further, the controller 11 decreases the volume when the proximity sensor 18 detects a gesture where a user moves his/her hand from up to down at step S106.

As described above, the electronic device 1 according to the present embodiment includes the proximity sensor 18 and the communication unit 17. The electronic device 1 further includes the controller 11 configured to respond based on a gesture detected via the proximity sensor 18 when the communication unit 17 detects an incoming call while a recipe is displayed. As described above, the controller 11 executes, for example, a process of scrolling a screen, and the like, in response to a gesture when a recipe is displayed in the second mode (i.e. kitchen mode). The controller 11 executes a process for answering, cancelling or ending of the call in response to gestures made when an incoming call arrives during display of a recipe. Specifically, the electronic device 1 according to the present embodiment can consistently perform a variety of processes via gestures and in response to various situations, and thus provides improved operability. Further, in the past, the user needed to touch an electronic device to answer a call during a cooking. However, the electronic device 1 according to the present embodiment allows the user to hygienically answer a call without touching the electronic device 1 even if his/her hands are dirty.

One Embodiment

The electronic device 1 according to one embodiment is described with reference to FIGS. 12A through 14. The configuration of the electronic device 1 according to the present embodiment is the same as that according to the above described embodiment. As described below, the electronic device 1 according to the present embodiment includes an interface that clearly conveys to the user whether an input operation using gestures is possible.

(Screen Display Example)

Figure 12A:
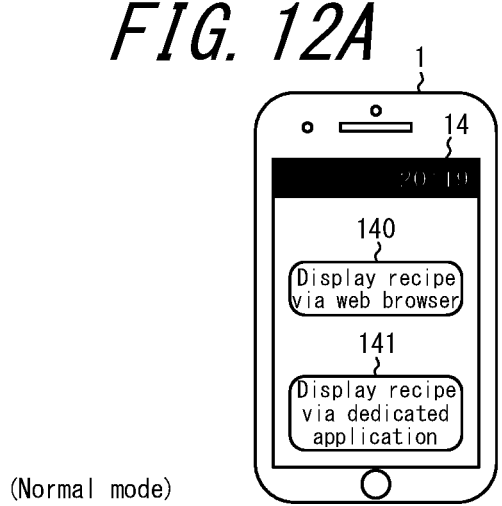
FIGS. 12A through 12F are diagrams each illustrating a screen display of the electronic device.
Figure 12B:
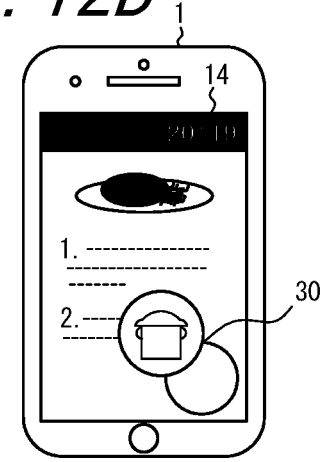

FIGS. 12A through 12F illustrate examples of screens displayed on the display 14 of the electronic device 1 according to the present embodiment. As described above, in addition to the first mode (i.e. normal mode), the electronic device 1 has a second mode (i.e. kitchen mode) suitable for cooking in a kitchen while a recipe is displayed. When the screens illustrated in FIGS. 12A and 12B are displayed, the electronic device 1 operates in the first mode (i.e. normal mode). When the screens illustrated in FIGS. 12C, 12D, 12E and 12F are displayed, the electronic device 1 operates in the second mode (i.e. kitchen mode).

FIG. 12A is an example of a screen that includes selection buttons 140 and 141. The user taps the selection button 140 or the selection button 141 to display a recipe search screen. The user can then display a recipe, which results from a search.

The selection button 140 is selected when the user searches for a recipe via the web browser and displays the recipe, which is a search result. Specifically, when the user selects the selection button 140, the recipe is displayed via the web browser. Further, the selection button 141 is selected when the user searches for a recipe via a dedicated application and displays the recipe, which is a search result. Specifically, when the user selects the selection button 140, a recipe is displayed via a dedicated application related to the recipe. Although the dedicated application can access the server over the Internet to obtain recipe data, some recipe data is already stored in the storage 16 of the electronic device 1. Even if the user is in an environment where a transmission speed is low, for example, he/she can quickly search for and display a recipe stored in the storage 16 via the dedicated application through selection of the selection button 141.

FIG. 12B is an example of a screen displayed when the user taps the selection button 140 or 141 to search for a recipe via the web browser or the dedicated application, and display the recipe which results from the search on the screen. An icon 30 is displayed over the recipe on the screen illustrated in FIG. 12B. The icon 30 has a shape of two circles connected such that they partially overlap with each other. Either one of the circles of the icon 30 may be slightly larger than the other one. A picture of a pot is indicated on the larger circle of the icon 30. Upon detecting that the icon 30 has been tapped by the user, the controller 11 switches between the first mode and the second mode. When the screen illustrated in FIG. 12B is displayed, the electronic device 1 operates in the first mode (i.e. normal mode). When the user taps the icon 30, the mode of the electronic device 1 is switched to the second mode (i.e. kitchen mode). Further, the mode of the electronic device 1 is switched to the first mode when the user taps the icon 30 while the electronic device 1 is operating in the second mode.

Figure 12C:
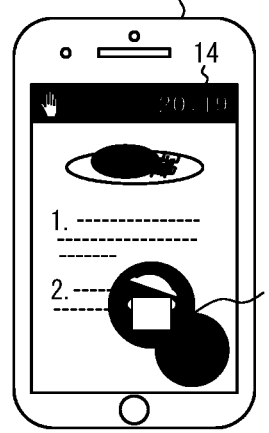

FIG. 12C is an example of the screen after the user has tapped the icon 30 and the mode of the electronic device 1 is switched to the second mode (i.e. kitchen mode). At this time, the electronic device 1 operates the proximity sensor 18 to enable detection of gestures by the user. The icon 30 displayed on the display 14 serves to enable the kitchen mode and gesture detection via the proximity sensor 18. Upon detecting a touch on the icon 30, the controller 11 starts the kitchen mode and starts gesture detection via the proximity sensor 18, and changes a feature of the icon 30A. In the example illustrated in FIG. 12C, the controller 11 changes the color of the icon 30. The color inside the two circles of the icon 30 changes from white to black. The controller 11 also changes the shape of the icon 30. The picture of the pot in the icon 30 changes from showing the lid of the pot in a closed state to showing the lid of the pot in an open state.

When the screen illustrated in FIG. 12C is displayed, the controller 11 controls the screen display based on user gestures detected via the proximity sensor 18. When a gesture made by moving a hand in the vertical direction is detected via the proximity sensor 18, for example, the controller 11 scrolls the screen on which the recipe is displayed. Further, when a gesture made by holding a hand over the screen for a predetermined time period, such as one second, is detected via the proximity sensor 18, the controller 11 switches the recipe display to the timer screen display. Further, when the communication unit 17 detects an incoming call while a recipe is displayed in the second mode (kitchen mode), the controller 11 responds to the call based on the gesture detected via the proximity sensor 18 as described below.

(Incoming Call and Call in Second Mode)

Figure 12D:
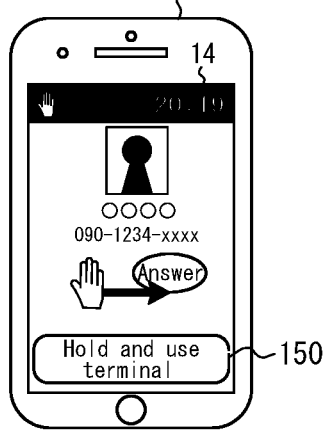

FIG. 12D is an example of a screen which is displayed upon arrival of an incoming call. When the incoming call arrives, the controller 11 switches the recipe display screen illustrated in FIG. 12C to the incoming call screen illustrated in FIG. 12D. In the screen example illustrated in FIG. 12D, an image, a name and a phone number of a caller are displayed on the display 14. Further, a guide indicating that the call can be answered by a gesture made by moving a hand from left to right is displayed on the display 14. The user can answer the call by making a gesture by moving his/her hand from left to right. At this time, the controller 11 operates the microphone 15 and the speaker 25 to enable hands-free communication. At this time, when determining that a predetermined time period has passed (e.g. 15 sec.) without the user answering the call, the controller 11 returns the screen to the recipe display screen illustrated in FIG. 12. Further, the controller 11 may cancel the call based on a gesture detected via the proximity sensor 18. For example, when the proximity sensor 18 detects a gesture of holding a hand over the screen for a predetermined period of time period (e.g. 3 sec.), the controller 11 cancels the call and returns the screen to the recipe display screen illustrated in FIG. 12C. At this time, the controller 11 may activate a message memo to record a message from a caller.

Figure 12E:

FIG. 12E is an example of a screen which is displayed when the user answers an incoming call. When the proximity sensor 18 detects a gesture made by moving a hand from left to right, the controller 11 switches the incoming call screen illustrated in FIG. 12D to the call in progress screen illustrated in FIG. 12E. In the screen example illustrated in FIG. 12E, an image, a name and a phone number of the caller and a call duration time are displayed in a small region of the display 14. Further, a guide indicating that the user can end the call via a gesture made by holding a hand over the screen is displayed on the display 14. When the proximity sensor 18 detects a gesture of holding a hand over the screen for a predetermined time period (e.g. 3 sec.), the controller 11 returns the screen to the recipe display screen illustrated in FIG. 12C.

Figure 12F:
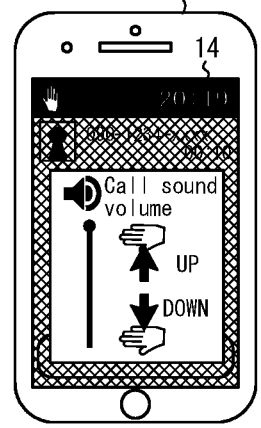

FIG. 12F is an example of a screen which is displayed when the user adjusts the sound volume during a call. The controller 11 changes the call sound volume based on gestures detected via the proximity sensor 18. For example, when the proximity sensor 18 detects a gesture made by moving a hand in the vertical direction, the controller 11 switches the call in progress screen illustrated in FIG. 12E to the call sound volume screen illustrated in FIG. 12F. In the screen example illustrated in FIG. 12F, a slide bar indicating the call sound volume is displayed on the display 14. Further, a guide indicating that the sound volume can be increased by a gesture made by moving a hand from down to up and that the sound volume can be decreased by making a gesture of moving a hand from up to down is displayed on the display 14. When determining that a predetermined time period (e.g. 3 sec.) has passed without the user performing a gesture for adjusting the sound volume, the controller 11 returns the screen to the call in progress screen illustrated in FIG. 12E.

(Discontinuation of Gesture Detection)

Figure 13A:
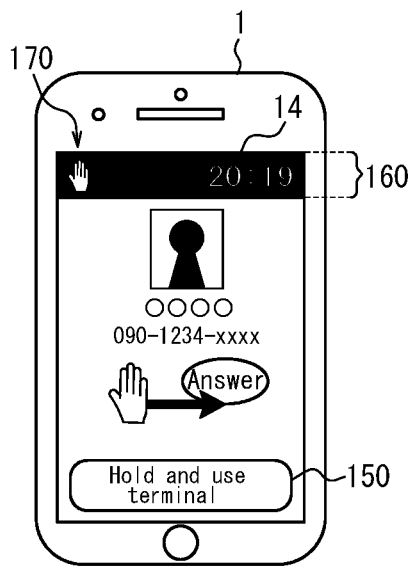
FIGS. 13A through 13D are diagrams each illustrating a change in the screen display of the electronic device when touched.

FIG. 13A is a diagram illustrating more specifically the incoming call screen in the second mode (kitchen mode) illustrated in FIG. 12D. As illustrated in FIG. 13A, a switch button 150 configured to stop gesture detection and switch to input operation through touches on the touch panel display (display 14) is provided at the bottom of the incoming call screen in the second mode. Further, the incoming call screen is displayed in full screen. The full screen is an entire area of the display 14 excluding a notification bar 160. The notification bar is a belt-like black area located on the upper part of the display 14. As illustrated in FIG. 13A, a pictogram (pictorial symbol) indicating that the proximity sensor 18 can detect a gesture is displayed on the notification bar 160. Further, the current time is displayed on the notification bar 160. The notification bar may further include other pictograms indicating, for example, a radio wave state, a manner mode, a battery charge state, and the like.

When the communication unit 17 detects an incoming call while the user operates his/her own device (i.e. electronic device 1) based on a gestures detected via the proximity sensor 18, the screen illustrated in FIG. 13A is displayed. Further, when the user touches the switch button 150 on the touch panel display (display 14) to answer the call, the controller 11 turns off gesture detection via the proximity sensor 18.

Figure 13B:
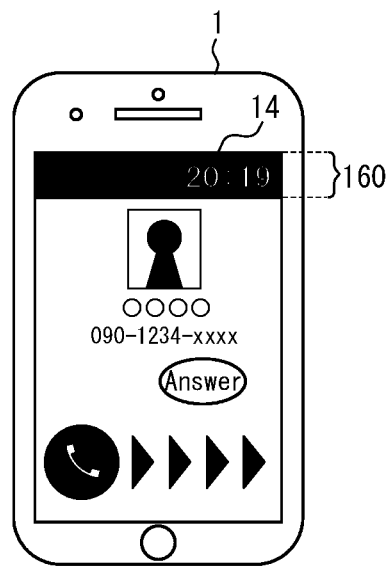

The controller 11 turns off gesture detection via the proximity sensor 18 and switches the input operation method to touch via the touch panel. The electronic device 1 operates in the first mode (i.e. normal mode). The controller 11 then displays the screen illustrated in FIG. 13B. FIG. 13B is an incoming call screen displayed in the first mode. A guide indicating that the user can answer the call through a touch operation of moving his/her hand from left to right (i.e. a slide operation) is displayed on the incoming call screen illustrated in FIG. 13B.

When the gesture detection via the proximity sensor 18 is turned on, the controller 11 displays a pictogram 170 on the notification bar 160 on the touch panel display (i.e. display 14). When the gesture detection via the proximity sensor 18 is turned off, the controller 11 hides the pictogram 170 on the notification bar 160 on the touch panel display (i.e. display 14). In the screen illustrated in FIG. 13B, the pictogram 170 is not displayed on the notification bar 160. The user visually recognizes that gesture detection via the proximity sensor 18 is not turned on (i.e. enabled).

Figure 13C:
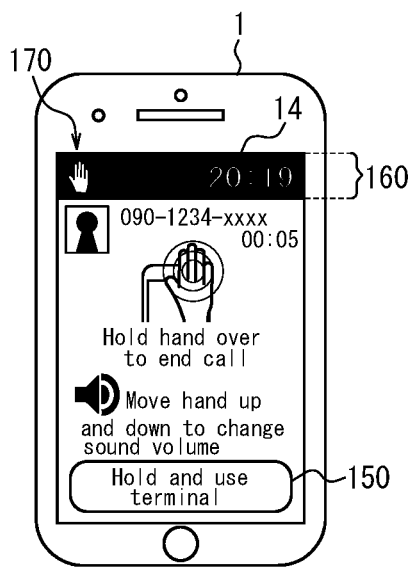

FIG. 13C is a diagram that illustrates more specifically the call in progress screen displayed in the second mode (i.e. kitchen mode) illustrated in FIG. 12E. As illustrated in FIG. 13C, the switch button 150 configured to stop gesture detection and switch to input operation by touch on the touch panel display (i.e. display 14) is provided at the bottom of the call inprogress screen displayed in the second mode. Further, the call in progress screen is displayed in full screen (i.e. the entire area of the display 14 excluding the notification bar 160). As illustrated in FIG. 13C, the pictogram 170 and the current time are displayed on the notification bar 160.

When the user taps the switch button 150 on the touch panel display (i.e. display 14) illustrated in FIG. 13C, the controller 11 turns off the gesture detection performed via the proximity sensor 18.

Figure 13D:
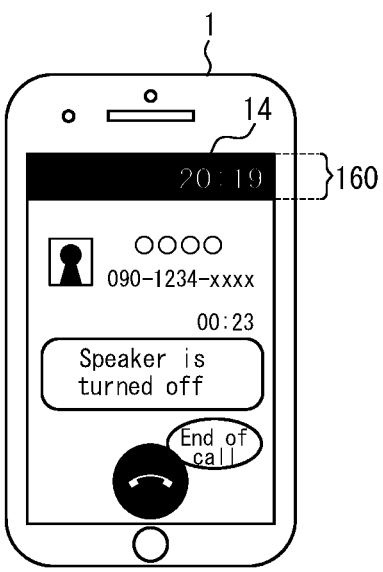

The controller 11 turns off the gesture detection performed via the proximity sensor 18 and switches the input operation method to touch via the touch panel. The electronic device 1 operates in the first mode (i.e. normal mode). The controller 11 then displays the screen illustrated in FIG. 13D. FIG. 13D is a call in progress screen for the electronic device 1 in the first mode. The call in progress screen illustrated in FIG. 13D displays a notification indicating that the hands-free call is ended and the speaker 25 is turned off. Further, the call in progress screen illustrated in FIG. 13D indicates that the user can end the call through a touch operation (i.e. tap operation) in which the user touches the end call icon. Note that other icons such as an icon for displaying dial keys, an icon for turning on the speaker 25 and the like can be displayed on the call in progress screen illustrated in FIG. 13D.

The pictogram 170 (pictorial symbol) is not displayed on the notification bar 160 of the screen illustrated in FIG. 13D. The user may visually recognize that gesture detection via the proximity sensor 18 is turned off (i.e. disabled) from the fact that the pictogram 170 is not displayed on the notification bar 160. Display or non-display of the pictogram 170 is linked with the on (i.e. enabled) or off (i.e. disabled) states of gesture detection via the proximity sensor 18. In cases where the proximity sensor 18 is operated but detection is performed with respect to a relative distance between the electronic device 1 and an object in the vicinity thereof and not with respect to a gesture, for example, the pictogram 170 is not displayed.

(Flowchart)

FIG. 14 is a flowchart illustrating an example of process steps (i.e. control method) executed by the controller 11 of the electronic device 1 according to the present embodiment. The flowchart in FIG. 14 illustrates a screen switching process upon arrival of an incoming call while the electronic device 1 is in the second mode (i.e. kitchen mode) and is displaying a recipe.

When the communication unit 17 does not detect an incoming call (No at step S201), the controller 11 waits for an incoming call while displaying a recipe on the display 14. When the communication unit 17 detects an incoming call (Yes at step S201), the controller 11 displays an incoming call screen in the second mode (step S202). The incoming call screen in the second mode is a screen as illustrated in FIG. 13A, for example. At this time, the gesture detection via the proximity sensor 18 is turned on (i.e. enabled), and thus the pictograph 170 is displayed.

When a touch on the touch panel display (i.e. display 14) by the user is not detected (No at step S203), the controller 11 executes the process step S204. Specifically, when the proximity sensor 18 detects a gesture associated with answering the call (Yes at step S204), the controller 11 displays the call in progress screen in the second mode (step S205). The call in progress screen in the second mode is a screen as illustrated in FIG. 13C, for example. At this time, the gesture detection via the proximity sensor 18 is turned on (i.e. enabled), and thus the pictogram 170 is displayed. Further, in the present embodiment, a gesture associated with answer is a gesture where the user moves his/her hand from left to right.

When the proximity sensor 18 does not detect a gesture associated with answering the call (No at step S204), the controller 11 causes the process to return to step S203.

The controller 11 executes the process step S206 after the call in progress screen in the second mode has been displayed (step S205). Specifically, the controller 11 executes the process step S211 upon detecting a touch on the touch panel display (i.e. display 14) by the user. In the present embodiment, the touch on the touch panel display is a tap on the switch button 150.

When a touch on the touch panel display (display 14) by the user is not detected (No at step S206), the controller 11 executes the process of step S207. Specifically, when the proximity sensor 18 detects a gesture associated with ending the call or detects ending of the call by the caller (Yes at step S207), the controller 11 displays a recipe in the second mode (step S208) and ends a series of process steps. The screen that displays the recipe in the second mode is a screen as illustrated in FIG. 12C, for example. Further, the gesture associated with end of call is a gesture where the user holds his/her hand over the screen for a predetermined time period (e.g. 3 sec.), for example. The controller 11 detects ending of the call by the caller via the communication unit 17.

When the proximity sensor 18 detects neither a gesture associated with end of call nor ending of the call by the caller (No at step S207), the controller 11 causes the process to return to step S206.

Upon detecting a touch on the touch panel display (i.e. display 14) by the user (Yes at step S203) after displaying the incoming call screen in the second mode (step S202), the controller 11 executes process step S209. In the present embodiment, the touch on the touch panel display is a tap on the switch button 150.

The controller 11 displays an incoming call screen in the first mode in process step S209. The incoming call screen in the first mode is a screen as illustrated in FIG. 13B, for example. At this time, gesture detection via the proximity sensor 18 is turned off (i.e. disabled), and thus the pictogram 170 is not displayed.

When detecting a touch associated with answering the incoming call (Yes at step S210), the controller 11 displays a call in progress screen in the first mode (step S211). The call in progress screen in the first mode is a screen as illustrated in FIG. 13D, for example. At this time, the gesture detection via the proximity sensor 18 is turned off (i.e. disabled), and thus the pictogram 170 is not displayed. In the present embodiment, the touch operation associated with answering the incoming call is a touch operation from left to right (slide operation).

Further, when a touch associated with answering the incoming call is not detected (No at step S210), the controller 11 waits until a touch associated with answering the incoming call is detected.

The controller 11 executes process step S212 after displaying the call in progress display in the first mode (step S211). Specifically, when detecting a touch associated with ending of the call or detecting ending of call by the caller (Yes at step S212), the controller 11 displays a recipe in the first mode (step S213) and ends the series of process steps. Note that the screen on which the recipe is displayed in the first mode is a screen as illustrated in FIG. 12B, for example. Further, the touch operation associated with ending of the call is an operation of touching the end of call icon (i.e. tap operation), for example.

Further, when a touch associated with ending of the call is not performed and ending of call by the caller is not detected (No at step S212), the controller 11 waits until a touch associated with ending of call or ending of the call by the caller is detected.

As described above, the electronic device 1 according to the present embodiment includes the proximity sensor 18, the display 14 serving as a touch panel display and the communication unit 17. The electronic device 1 is used based on gestures detected via the proximity sensor 18. In this case, the electronic device 1 further includes the controller 11 configured to turn off gesture detection via the proximity sensor 18 when an incoming call is detected by the communication unit 17 and the user touches the touch panel display to answer the call. Even when using input operations based on gestures, the electronic device 1 turns off the gesture detection if the user touches the touch panel display. At this time, the user can clearly recognize that gesture detection is turned off since touch on the display 14 by the user itself is the trigger. Therefore the electronic device 1 according to the present embodiment provides improved operability compared with that of conventional electronic devices.

Further, in the electronic device 1 according to the present embodiment, the pictogram 170 displayed or not displayed in response to the ON (i.e. enabled) or OFF (i.e. disabled) states of the gesture detection via the proximity sensor 18 is used. Thus the pictogram 170 allows the user to visually recognize the state of the gesture detection via the proximity sensor 18. Therefore the electronic device 1 according to the present embodiment provides improved operability compared with that of conventional electronic devices.

Some Embodiments

Although the present disclosure has been described with reference to the accompanying drawings and embodiments, it is to be noted that various changes and modifications can be easily made by those skilled in the art. Therefore, such changes and modifications are to be understood as included within the technical scope of the present disclosure. For example, the functions and the like included in each unit or step may be reordered in any logically consistent way. Further, units, steps and the like may be combined into one or divided.

In the above described embodiment, during operation based on a gesture detected via the proximity sensor 18, when a gesture different from the detected gesture is detected the controller 11 scales up or scales down the icon 30 for display. In this case, the controller 11 may set transparent or non-transparent background for the icon 30 instead of the scaling up or scaling down. For example, when the proximity sensor 18 detects a gesture made by moving a hand from left to right, the controller 11 sets a transparent background for the icon 30. Further, when the proximity sensor 18 detects a gesture made by moving a hand from right to left, the controller 11 returns the state of the icon 30 to the state in which the icon 30 is displayed with a non-transparent background. Note that "sets a transparent background for the icon 30" means that the icon 30 is displayed in a transparent or a translucent manner such that the user can visually recognize the background image of the icon 30. Further, "the icon 30 is displayed with a non-transparent background" means that the icon 30 is in an opaque state as illustrated in FIG. 6C, for example.

In the above described embodiment, the controller 11 changes the call sound volume based on the gesture made by moving a hand in the vertical direction detected via the proximity sensor 18. Further, the controller 11 answers the call via the incoming call screen based on a gesture made moving a hand from left to right detected via the proximity sensor 18. In the present embodiment, although the above described gestures are different from each other, they may have a commonality (partially or entirely). For example, the controller 11 may change the call sound volume based on a gesture made by moving a hand in the horizontal direction detected via the proximity sensor 18. Commonalization of gestures used in different situations may allow the user to avoid the burden of having to memorize a large number of gestures.

In the above described embodiment, the controller 11 cancels a call based on a gesture of holding a hand over the screen for a predetermined period of time (i.e. 3 sec.) detected via the proximity sensor 18. Further, the controller 11 changes the call sound volume based on a gesture made by moving a hand in the vertical direction detected via the proximity sensor 18. In the present embodiment, although these gestures are different from each other, they may have a commonality. For example, the controller 11 may cancel a call based on a gesture made by moving a hand in the vertical direction detected via the proximity sensor 18.

Much of the subject matter in the present disclosure is described as a series of operations executed by a computer system and other hardware that can execute program instructions. Examples of the computer system and other hardware include, for example, a general-purpose computer, a Personal Computer (PC), a dedicated computer, a workstation, a Personal Communications System (PCS), a mobile (cellular) phone, a mobile phone provided with a data processing function, a RFID receiver, a game machine, an electronic notepad, a laptop computer, a Global Positioning System (GPS) and a receiver or other programmable data processing apparatuses. It should be noted that in each embodiment, various operations or control methods are executed by a dedicated circuit (for example, individual logical gates interconnected in order to execute a particular function) implemented by program instructions (software), or by a logical block, program module, and the like executed by one or more processors. The one or more processors that execute a logical block and/or program module, and the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a processor, a controller, a microcontroller, an microprocessor, an electronic device, another apparatus designed to be capable of executing the functions disclosed herein, and/or a combination of any of the above. The embodiments disclosed herein are, for example, implemented by hardware, software, firmware, middleware, microcode, or a combination of any of these. The instruction may be a program code or a code segment for executing a necessary task. The instruction can then be stored in a machine readable non-transitory storage medium and other medium. Code segments may be a combination of any of a procedure, a function, a subprogram, a program, a routine, a subroutine, a module, a software package, a class or an instruction, and a data structure or a program statement. The code segment sends and/or receives information, data argument, variable or stored contents with the other code segment or hardware circuit to connect with the other code segment or hardware circuit.

The storage 16 used here may be configured as a computer-readable, tangible carrier (medium) in the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium (such as a Compact Disc (CD), a laser Disc®, Digital Versatile Disc (DVD®), a floppy Disc® and Blu-ray Disc® (laser disc, DVD, floppy disc and Blu-ray disc are each a registered trademark in Japan, other countries, or both)), a portable computer disc, a Random Access Memory (RAM), a Read-Only Memory (ROM), a rewritable programmable ROM such as an Erasable Programmable Read-Only Memory (EPROM), an Electrically Erasable Programmable Read-Only Memory (EEPROM), or flash memory, another tangible storage medium that can store information, or a combination of any of these. The memory may be provided internal and/or external to a processor/processing unit. As used in the present disclosure, the term "memory" refers to all types of long-term storage, short-term storage, volatile, non-volatile, or other memory. No limitation is placed on the particular type or number of memories, or on the type of medium for memory storage.

The invention claimed is:

1. An electronic device, comprising:
a proximity sensor;
a touch panel display;
a communication unit; and
a controller configured to determine that an incoming call is detected via the communication unit while the electronic device is being controlled by a user via gesture detection and the user touches the touch panel display to answer the incoming call, and then turn off gesture detection via the proximity sensor,
wherein the controller is configured to detect a slide operation while touching the touch panel display to answer the incoming call.

2. The electronic device according to claim 1, wherein the controller is configured to determine when the electronic device is used, and then display a recipe.

3. The electronic device according to claim 1, wherein
the controller is configured to determine that gesture detection via the proximity sensor is turned on, and then display a pictogram on the touch panel display, and
the controller is configured to determine that gesture detection via the proximity sensor is turned off, and then not display a pictogram on the touch panel display.

4. The electronic device according to claim 3, wherein the pictogram is displayed on a notification bar.

5. A control method of an electronic device that comprises a proximity sensor, a touch panel display and a communication unit, the method comprising:
detecting an incoming call by the communication unit while the electronic device is being controlled by a user via gesture detection and the user touched the touch panel display to answer the incoming call, and
turning off gesture detection via the proximity sensor,
wherein the controller is configured to detect a slide operation while touching the touch panel display to answer the incoming call.

* * * * *